(12) United States Patent  (10) Patent No.: US 6,655,748 B2
Coleman et al.  (45) Date of Patent: Dec. 2, 2003

(54) FABRICATED VEHICLE WHEEL

(75) Inventors: Alan Coleman, Southgate, MI (US); Thomas E. Heck, Monroe, MI (US); Todd Duffield, Westland, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 10/161,405

(22) Filed: May 31, 2002

(65) Prior Publication Data

US 2003/0080607 A1 May 1, 2003

Related U.S. Application Data

(60) Provisional application No. 60/338,531, filed on Oct. 30, 2001.

(51) Int. Cl.[7] ................................................ B60B 3/10
(52) U.S. Cl. ..................................... 301/64.101; 301/67
(58) Field of Search ............................ 301/67, 68, 69, 301/70, 71, 72, 64.101, 64.201, 64.202, 64.203, 74, 78, 63.101, 63.102, 65; D12/204, 205, 209; 411/501, 502, 503

(56) References Cited

U.S. PATENT DOCUMENTS

| 1,013,625 | A | * | 1/1912 | Stimpson .................... 411/502 |
|---|---|---|---|---|
| 1,120,378 | A | * | 12/1914 | Eaton ......................... 411/502 |
| 1,487,904 | A | * | 3/1924 | Walters et al. .......... 301/64.201 |
| 2,058,338 | A | * | 10/1936 | Meissner .................... 411/503 |
| 2,339,859 | A | * | 1/1944 | Hunt et al. ............. 301/64.201 |
| 3,250,571 | A | * | 5/1966 | Richter ........................ 301/65 |
| 4,181,365 | A | * | 1/1980 | Kawaguchi et al. .......... 301/67 |
| 4,256,346 | A | * | 3/1981 | Kawaguchi et al. .......... 301/79 |
| 4,319,785 | A | * | 3/1982 | Sato et al. ................... 301/6.3 |
| 4,643,484 | A | * | 2/1987 | Luter et al. ................ 301/11.3 |
| 5,918,947 | A | * | 7/1999 | Stach et al. ................... 301/65 |
| D419,942 | S | * | 2/2000 | Lampkin .................. D12/209 |
| 6,042,194 | A | | 3/2000 | Fitz et al. |
| 6,244,669 | B1 | | 6/2001 | Braunschweiler |
| 2002/0003374 | A1 | | 1/2002 | Braunschweiler |

FOREIGN PATENT DOCUMENTS

| EP | 0 935 536 | 12/2001 |
|---|---|---|
| WO | 98/19874 | 5/1998 |
| WO | 99/65709 | 12/1999 |

* cited by examiner

Primary Examiner—S. Joseph Morano
Assistant Examiner—Long Bao Nguyen
(74) Attorney, Agent, or Firm—MacMillan, Sobanski & Todd, LLC

(57) ABSTRACT

This invention relates to an improved fabricated vehicle wheel. According to one embodiment of the invention, the vehicle wheel includes a wheel rim having a plurality of holes formed therein; a wheel disc having a central mounting surface and a plurality of outwardly extending spokes, each of the spokes having at least two holes formed therein; at least one rim to disc interface area provided along each of the spokes wherein some portion of a surface of the rim and some portion of a surface of the spoke contact one another; and a fastener extending through each of the at least two holes of each of the spokes and through an associated at least two holes of the plurality of holes of the rim to secure the rim and disc together.

51 Claims, 21 Drawing Sheets

FABRICATED VEHICLE WHEEL

CROSS-REFERENCE TO RELATED APPLICATIONS

This application claims the benefit of U.S. Provisional Application Ser. No. 60/338,531, filed Oct. 30, 2001.

BACKGROUND OF THE INVENTION

This invention relates in general to vehicle wheels and in particular to an improved fabricated vehicle wheel.

A conventional fabricated vehicle wheel is typically of a two-piece construction and includes an inner disc and an outer "full" rim. The disc can be cast, forged, or fabricated from steel, aluminum, or other alloys, and includes an inner annular wheel mounting portion and an outer annular portion. The wheel mounting portion defines an inboard mounting surface and includes a center pilot or hub hole, and a plurality of lug receiving holes formed therethrough for mounting the wheel to an axle of the vehicle. The rim is fabricated from steel, aluminum, or other alloys, and includes an inboard tire bead seat retaining flange, an inboard tire bead seat, an axially extending well, an outboard tire bead seat, and an outboard tire bead seat retaining flange. In some instances, a three-piece wheel construction having a mounting cup secured to the disc is used. In both types of constructions, the outer annular portion of the disc is typically secured to the rim by welding.

A full face fabricated wheel is distinguished from other types of fabricated wheels by having a one-piece wheel disc construction. In particular, the full face wheel includes a "full face" disc and a "partial" rim. The full face disc can be formed cast, forged, or fabricated from steel, aluminum, or other alloys. The full face disc includes an inner annular wheel mounting portion and an outer annular portion which defines at least a portion of an outboard tire bead seat retaining flange of the wheel. The wheel mounting portion defines an inboard mounting surface and includes a center pilot or hub hole, and a plurality of lug receiving holes formed therethrough for mounting the wheel to an axle of the vehicle. The partial rim is fabricated from steel, aluminum, or other alloys, and includes an inboard tire bead seat retaining flange, an inboard tire bead seat, an axially extending well, and an outboard tire bead seat. In some instances, the outboard tire bead seat of the rim and the outer annular portion of the disc cooperate to form the outboard tire bead seat retaining flange of the full face wheel. In both types of constructions, the outboard tire bead seat of the rim is positioned adjacent the outer annular portion of the disc and a weld is applied to secure the rim and the disc together.

A fabricated vehicle wheel is shown in U.S. Pat. No. 6,042,194 to Fitz et al. As shown in the embodiment illustrated in FIGS. 4 and 5 of the Fitz et al. patent, the wheel includes an outer full rim and an inner one piece disc having a plurality of spoke members. Each spoke member includes an outer end which is welded to the rim to produce the vehicle wheel. The Fitz et al. patent discloses other embodiments of a wheel construction having individual spoke members which are secured to the rim in a similar manner.

SUMMARY OF THE INVENTION

This invention relates to an improved fabricated vehicle wheel. According to one embodiment of the invention, the vehicle wheel includes a wheel rim having a plurality of holes formed therein; a wheel disc having a central mounting surface and a plurality of outwardly extending spokes, each of the spokes having at least two holes formed therein; at least one rim to disc interface area provided along each of the spokes wherein some portion of a surface of the rim and some portion of a surface of the spoke contact one another; and a fastener extending through each of the at least two holes of each of the spokes and through an associated at least two holes of the plurality of holes of the rim to secure the rim and disc together.

Other advantages of this invention will become apparent to those skilled in the art from the following detailed description of the preferred embodiments, when read in light of the accompanying drawings.

DESCRIPTION OF THE PREFERRED EMBODIMENTS

Figure 1:
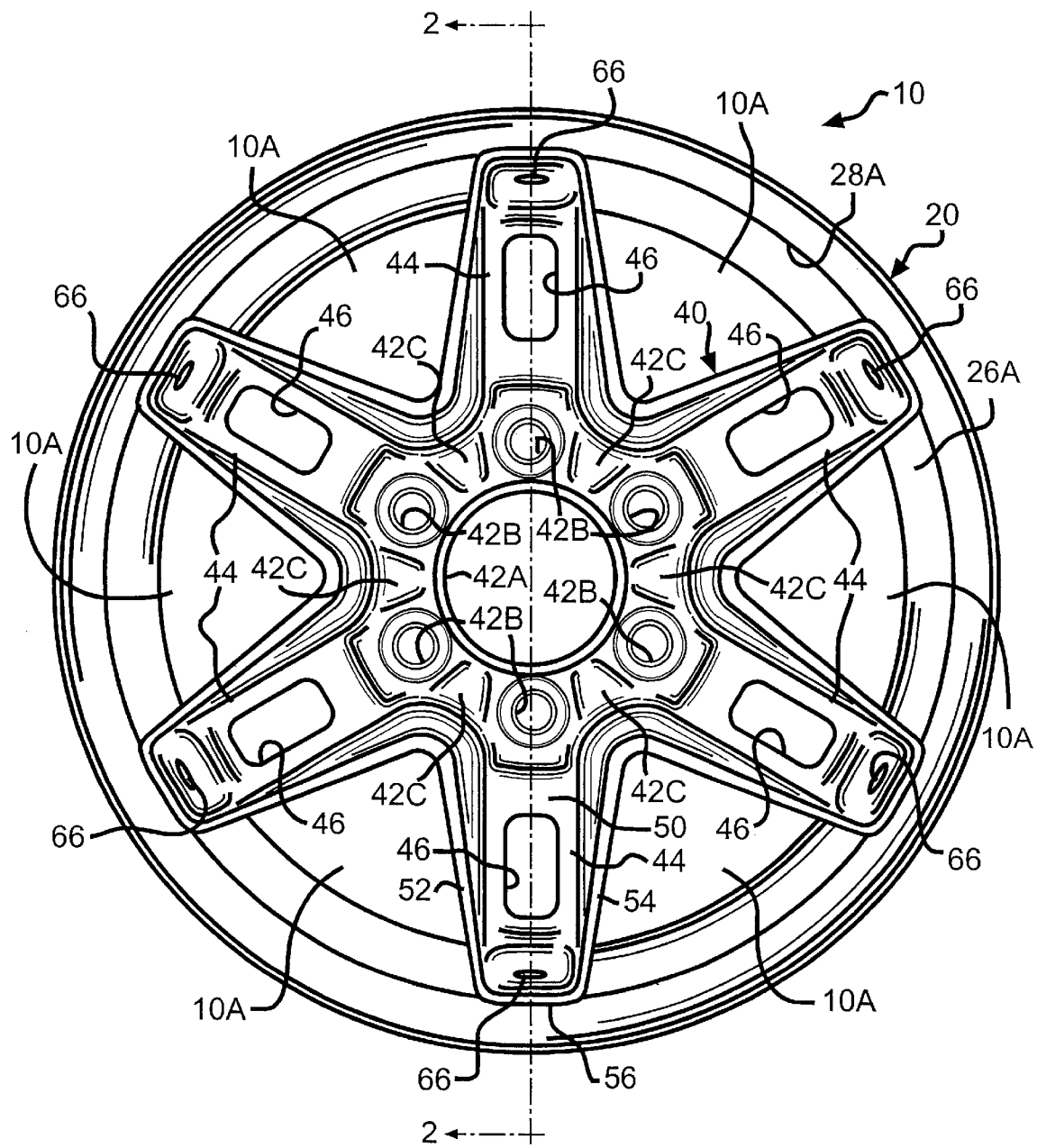
FIG. 1 is a front view of a first embodiment of a fabricated vehicle wheel in accordance with the present invention.
Figure 2:
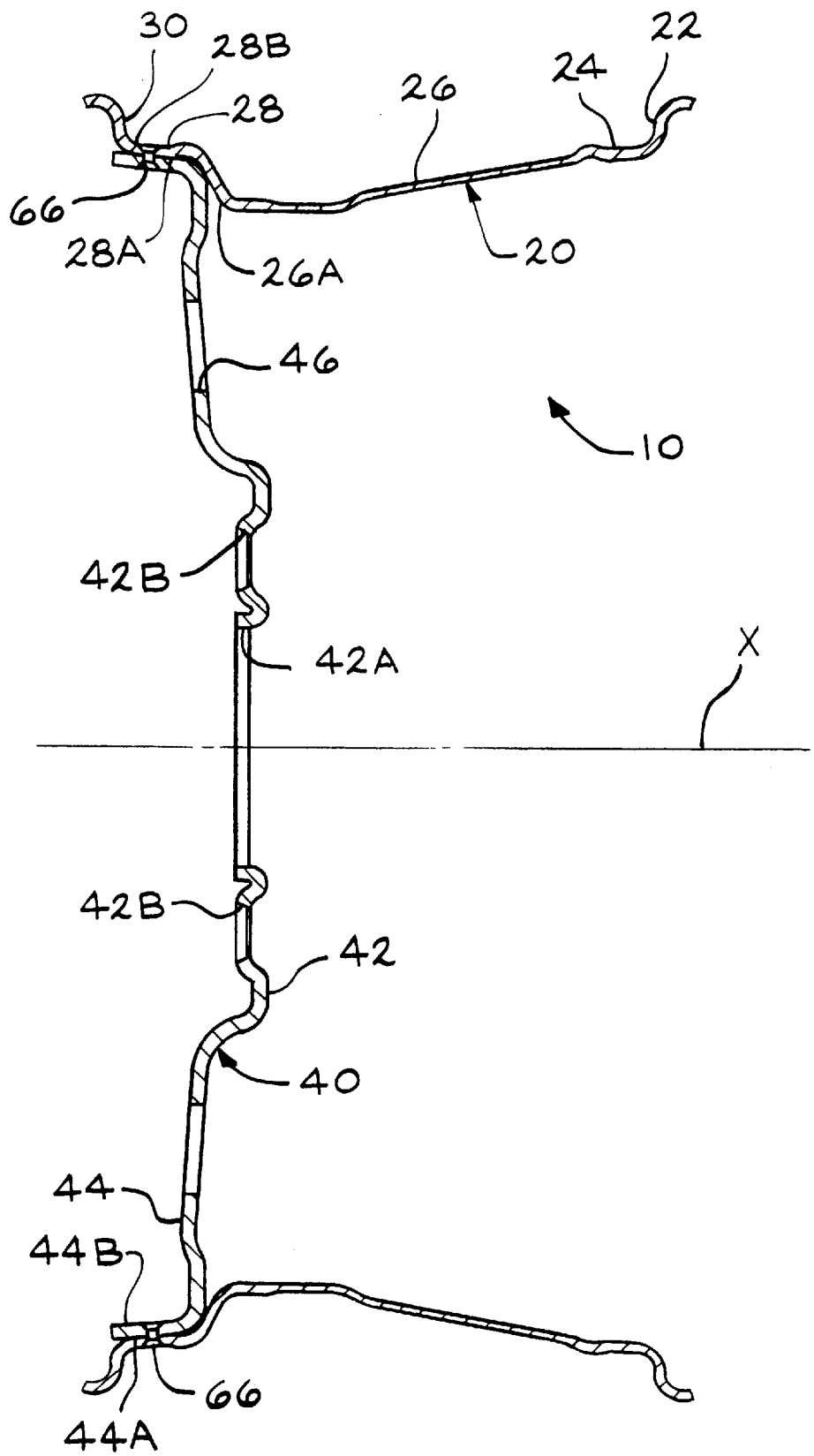
FIG. 2 is a sectional view of the vehicle wheel taken along line 2—2 of FIG. 1.
Figure 3:
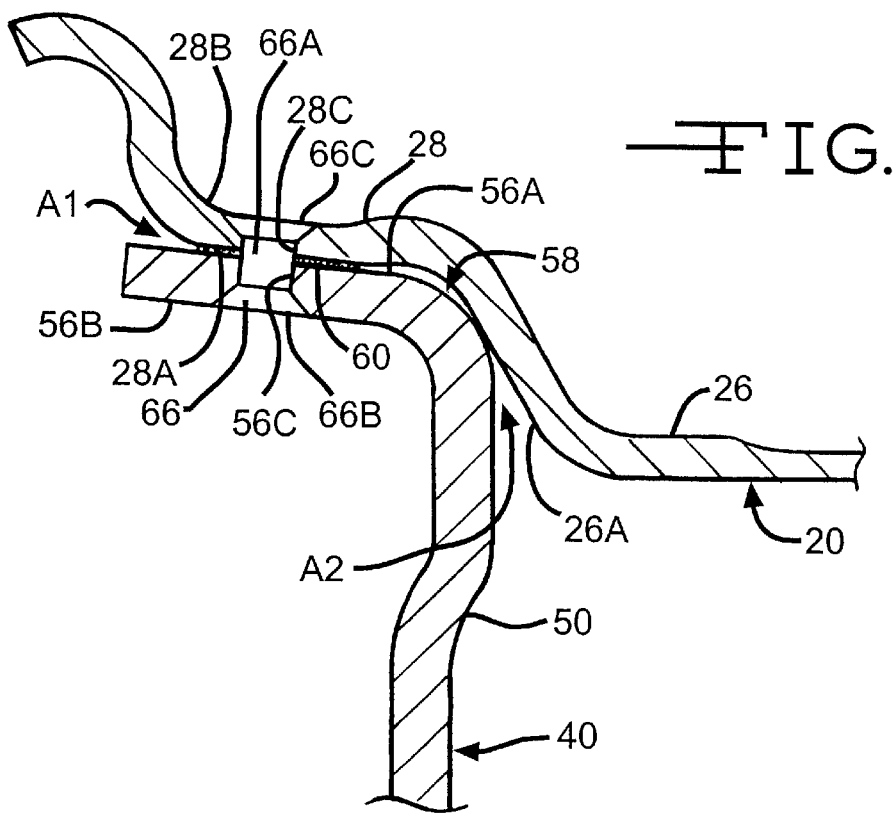
FIG. 3 is an enlarged view of a portion of the vehicle wheel illustrated in FIGS. 1 and 2 showing a first embodiment of a method for joining the wheel rim and the wheel disc together in accordance with the present invention.

Referring now to the drawings, FIGS. 1 through 3 illustrate a first embodiment of a fabricated vehicle wheel, indicated generally at 10, produced in accordance with the present invention. The vehicle wheel 10 produced according to this invention is illustrated as being a fabricated "bead seat attached" vehicle wheel. The fabricated bead seat attached vehicle wheel 10 includes a full wheel rim 20 and an inner wheel disc 40 which are constructed and joined together in accordance with the present invention. The vehicle wheel 10 defines a horizontal or longitudinal vehicle wheel axis X. Although the present invention is illustrated and described in conjunction with the particular vehicle wheel constructions disclosed herein, it will be appreciated that the invention can be used in conjunction with other types of vehicle wheel constructions. For example, the vehicle wheel can be a "drop center" or "well attached" vehicle wheel (such as shown in FIG. 3 of U.S. Pat. No. 5,188,429 to Heck et al. and/or also as shown in FIGS. 23–27 and described hereinbelow), the disclosure of this patent incorporated herein by reference.

The wheel rim 20 is a fabricated rim formed from a suitable material, such as for example, steel, aluminum or alloys thereof, magnesium, or titanium. The wheel rim 20 includes an inboard tire bead seat retaining flange 22, an inboard tire bead seat 24, a generally axially extending well 26, an outboard tire bead seat 28, and an outboard tire bead seat retaining flange 30. The well 26 includes an outer surface 26A and the outboard tire bead seat 28 includes an outer surface 28A and an inner surface 28B. The outboard tire bead seat 28 further includes a plurality of holes 28C (best shown in FIG. 3), formed therein. As will be discussed below, the holes 28C are formed by a suitable process, such as for example, by piercing, drilling, or laser cutting.

The wheel disc 40 is forged, cast, fabricated, or otherwise formed from a suitable material, such as for example, steel, aluminum or alloys thereof, steel, magnesium, or titanium. The wheel disc 40 includes a generally centrally located wheel mounting surface or portion 42 and a plurality of outwardly extending spokes 44. In the illustrated embodiment, the disc 40 includes six of such spokes 44 which are shown as being formed integral with the wheel mounting surface 42. Alternatively, the number and/or the construction of the spokes 44 can be other than illustrated if so desired. For example, the vehicle wheel 10 can include less than six spokes 44 or more than six spokes 44 and/or the spokes 44 can be formed separate from the wheel mounting surface 42 of the disc 40 and joined thereto by a suitable method.

The wheel mounting surface 42 is provided with a centrally located pilot aperture 42A and a plurality of lug bolt receiving holes 42B circumferentially spaced around the pilot aperture 42A. In the illustrated embodiment, the wheel mounting surface 42 includes six of such lug bolt receiving holes 42B which are preferably provided in the wheel mounting surface 42 "in line" with a respective one of each of the spokes 44. Alternatively, the number and/or the location of the lug bolt receiving holes 42B can be other than illustrated if so desired. The lug bolt receiving holes 42B receive lug bolts (not shown) and nuts (not shown) for securing the vehicle wheel 10 on an axle (not shown) of a vehicle.

The mounting surface 42 further includes a plurality of "strengthening" ribs 42C provided therein. In the illustrated embodiment, a rib 42C is located between each pair of lug bolt receiving holes 42B. Each of the ribs 42C is defined by a raised or embossed area which extends outwardly from or above the mounting surface 42 (best shown in FIG. 12 in connection with the embodiment discussed therewith). The ribs 42C are operative to strengthen the mounting surface 42 to keep it from flexing during vehicle operation thereby improving the fatigue life of the associated vehicle wheel. Alternatively, the spacing, location, number and/or configuration of the ribs 42C can be other than illustrated and described if so desired.

Each of the spokes 44 includes an inner surface 44A and an outer surface 44B. The wheel disc 40 may also include one or more openings or windows 46 formed in one or more of each of the spokes 44. In the illustrated embodiment, one of such windows 46 is provided in each of the spokes 44. Alternatively, the number and/or the location of the windows 46 can be other than illustrated if so desired.

Each spoke 44 of the wheel disc 40 includes a generally flat rear or back wall 50, a pair of opposed side walls 52 and 54 extending outwardly from the rear wall 50, and an outermost end wall 56 extending outwardly from the rear wall 50 which defines a mounting flange. The side walls 52 and 54 are operative to connect the associated spoke 44 to the wheel mounting surface 42 thereof. In the illustrated embodiment, the side walls 52 and 54 extend generally radially inwardly or non-parallel to one another and define a non-uniform or varying spoke width therebetween. Alternatively, the structure of one or both of the spoke side walls 52 and 54 can be other than illustrated if so desired.

The mounting flange 56 includes an inner surface 56A and an outer surface 56B. The mounting flange 56 of each spoke 44 is connected to the rear wall 50 by a transition portion 58. The transition portion 58 has a generally curved or rounded profile which generally corresponds to the profile of the adjacent outer surface 28A of the wheel rim 20 to which it is joined. The inner surface 56A of the mounting flange 56 of the spoke 44 and the outer surface 28A of the rim 20 define a first disc to rim interface area, indicated generally at A1, and an inner surface 58A of the transition portion 58 and the outer surface 26A of the rim 20 define a second disc to rim interface area, indicated generally at A2. Preferably, there is full or complete contact between the inner surface 56A of the mounting flange 56 of the spoke 44 and the outer surface 28A of the rim 20 at the first disc to rim interface area A1, and there is also full contact between the inner surface 58A of the transition portion 58 and the outer surface 26A of the rim 20 at the second disc to rim interface area A2. However, due to manufacturing tolerances and/or other design specifications, there may be less than full contact at one or both of the interface areas A1 and A2. In the illustrated embodiment, the mounting flange 56 of each spoke 44 is provided with a hole 56C for a purpose to be discussed below.

To assemble the vehicle wheel 10 in the illustrated embodiment, a suitable adhesive 60 is preferably first applied to the inner surface 56A of each spoke 44. A suitable adhesive 60 is a one part epoxy available under the name BETAMATE® 4601, manufactured by Dow Chemical Company of Midland, Mich. Alternatively, the type and/or the application of the adhesive 60 can be other than illustrated and described if so desired. For example, the adhesive 60 can be applied to the outer surface 28A of the rim 20.

Next, the wheel rim 20 and the wheel disc 40 are located relative to one another in a predetermined position. In this position, the wheel rim outer surface 28A is disposed adjacent the spoke flange inner surface 56A and with the rim outer surface 26A disposed adjacent the spoke transition inner surface 48A. While in this position, the wheel rim holes 28C and the spoke flange holes 56C are preferably formed in the rim 20 and spokes 44 at the same time by a suitable method, such as for example, by piercing, drilling or laser cutting. Forming the holes 28C and 56C in this manner ensures that the holes 28C and 56C are in proper alignment. Next, a suitable fastener 66 is installed in each of the aligned holes 28C and 56C to thereby join the wheel rim 20 and the wheel disc 40 together. Alternatively, the holes 28C and 56C can be separately provided in one or both of the rim 20 and spokes 44 prior to assembly if so desired. As can be seen in FIG. 1, due to the construction of the wheel disc 40, the resultant wheel 10 has a relatively large opening 10A formed therein between each pair of the spokes 44.

In the illustrated embodiment, the fastener 66 is a rivet and includes a generally round body 66A, an outer or head portion 66B, and an inner portion 66C. As best shown in FIG. 3, the holes 28C and 56C are preferably countersunk holes so that when the rivet 66 is installed no portion of the rivet 66 protrudes outside of the respective surfaces 28B and 56B of the wheel rim 20 and the wheel disc 40. Alternatively, the type, configuration, location and/or the number of fasteners 66 that are used can be other than illustrated if so desired. Also, as shown in this embodiment, preferably the inner surface 58A of the transition portion 58 and the outer surface 26A of the wheel rim well 26 abut or contact one another at the second disc to rim interface area A2; however, in some instances, depending upon the uniformity of the rim 20 and/or the disc 40 or depending upon the particular vehicle wheel construction, the inner surface 58A and the outer surface 26A may not abut or contact one another along portions thereof or at all.

Figure 4:
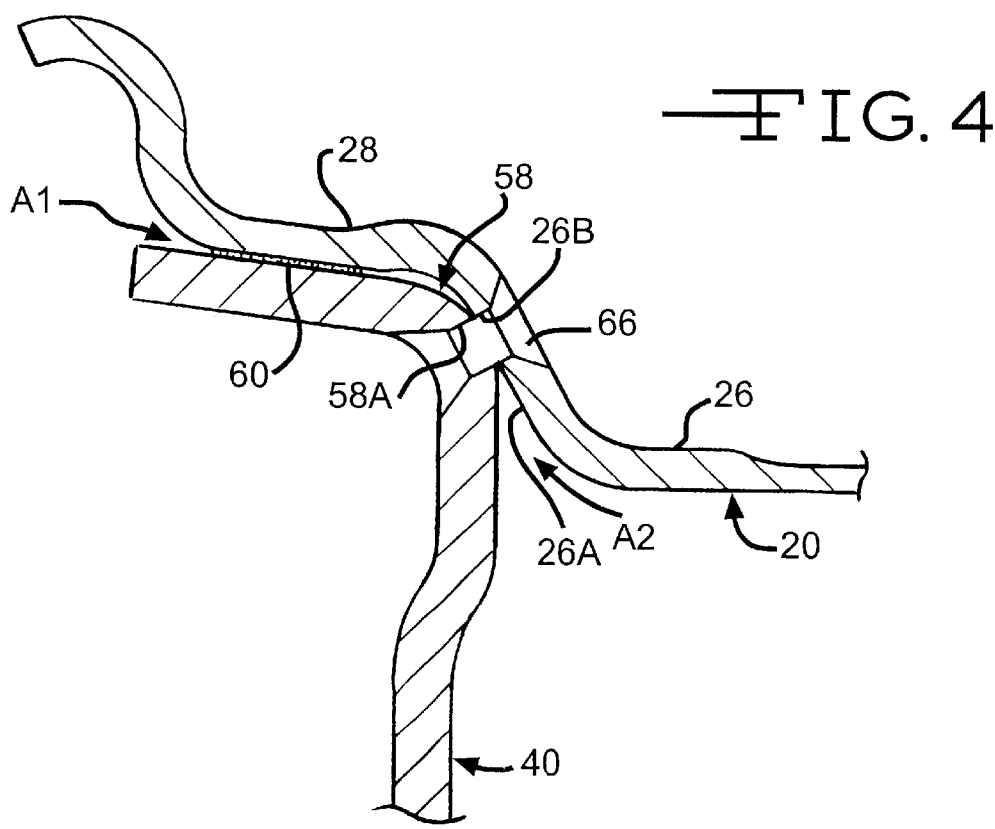
FIG. 4 is an enlarged view showing a second embodiment of a method for joining the wheel rim and the wheel disc together in accordance with the present invention.

Referring now to FIG. 4 and using like reference numerals to refer to like parts, there is illustrated a portion of a second embodiment of a method for joining the wheel rim 20 and the wheel disc 40 together in accordance with the present invention. As shown therein, in this embodiment the adhesive 60 is provided at the first disc to rim interface area A1 and the rivet 66 is provided at the second disc to rim interface area A2 to thereby join the wheel rim 20 and the wheel disc 40 together. To accomplish this, the well 26 of the rim 20 is provided with a plurality of holes 26B (only one of such holes 26B illustrated in FIG. 4), and the wheel disc spoke 44 is provided with a like number of holes 48A in the area of the transition portion 48 thereof.

Figure 5:
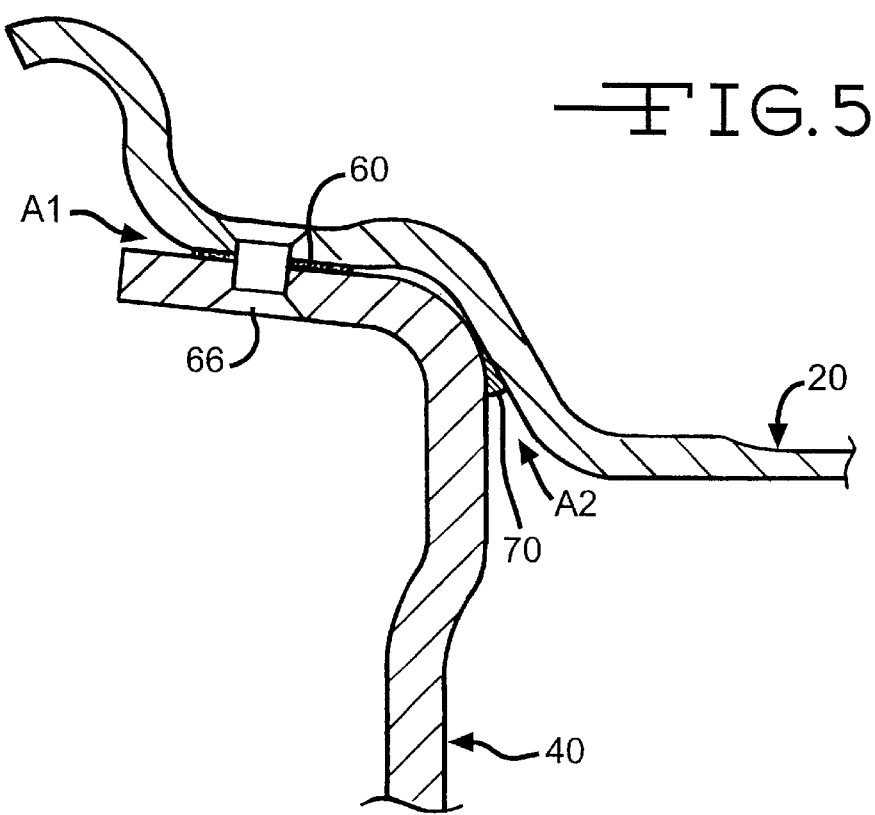
FIG. 5 is an enlarged view showing a third embodiment of a method for joining the wheel rim and the wheel disc together in accordance with the present invention.

Referring now to FIG. 5 and using like reference numerals to refer to like parts, there is illustrated a portion of a third embodiment of a method for joining the wheel rim 20 and the wheel disc 40 together in accordance with the present invention. As shown therein, in this embodiment the adhesive 60 and the rivet 66 are provided at the first disc to rim interface area A1, and a weld 70 is provided at the second disc to rim interface area A2 to thereby join the wheel rim 20 and the wheel disc 40 together.

Figure 6:
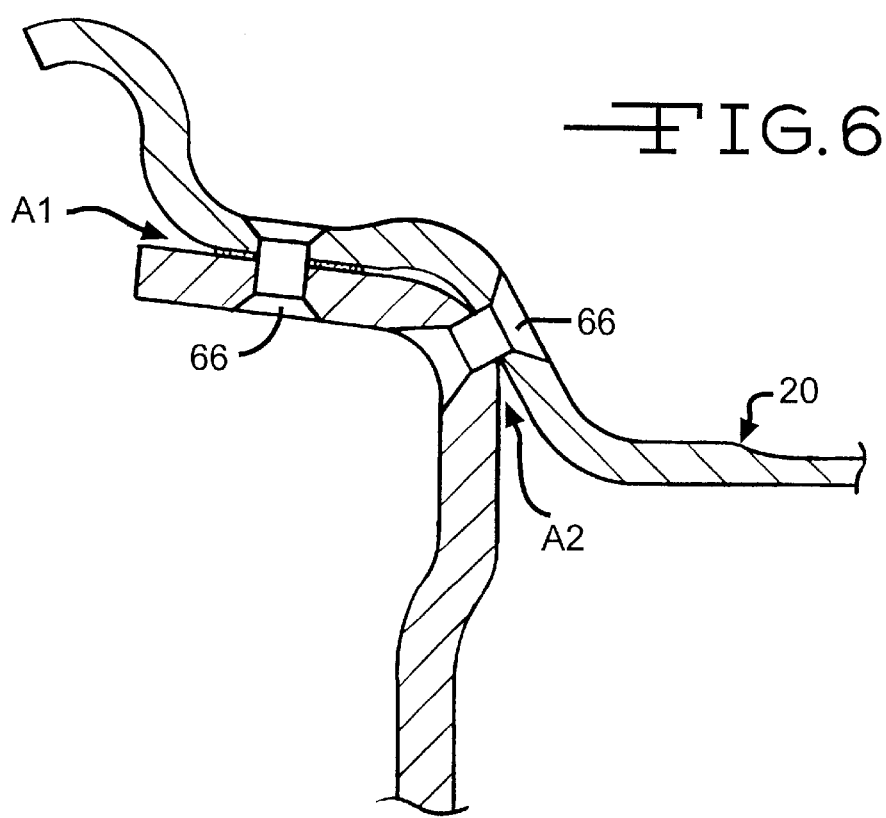
FIG. 6 is an enlarged view showing a fourth embodiment of a method for joining the wheel rim and the wheel disc together in accordance with the present invention.

Referring now to FIG. 6 and using like reference numerals to refer to like parts, there is illustrated a portion of a fourth embodiment of a method for joining the wheel rim 20 and the wheel disc 40 together in accordance with the present invention. As shown therein, in this embodiment the adhesive 60 is provided at the first disc to rim interface area A1, and the rivet 66 is provided at both the first and the second disc to rim interface areas A1 and A2 to thereby join the wheel rim 20 and the wheel disc 40 together. Alternatively, other combinations of adhesive 60 and/or fasteners 66 and/or welds 70 can be used to join the disc 40 and the rim 20 together. For example, adhesive 60 can be provided at the first disc to rim interface area A1, at the second disc to rim interface area A2, or at both the first disc to rim interface area A1 and the second disc to rim interface area A2; also, a suitable fastener 66 can be provided through associated holes in the first disc to rim interface area A1, through associated holes in the second disc to rim interface area A2, or through associated holes in both the first disc to rim interface area A1 and the second disc to rim interface area A2.

Figure 7:
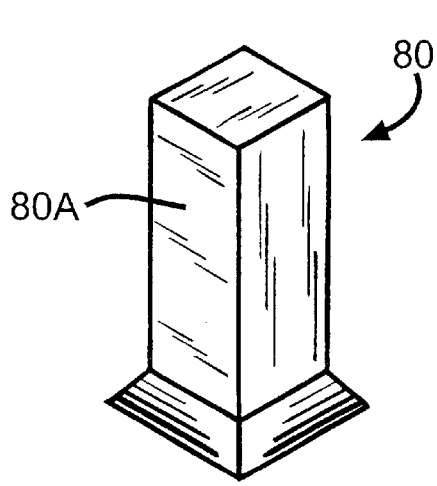
FIG. 7 is a view of a first alternate embodiment of a fastener that can be used to join the wheel rim and the wheel disc together in accordance with the present invention.

Referring now to FIG. 7, there is illustrated a second embodiment of a rivet 80 which can be used to join the wheel rim 20 and the wheel disc 40 together in accordance with the present invention. As shown therein, the rivet 80 includes a body 80A having a generally square cross section.

Figure 8:
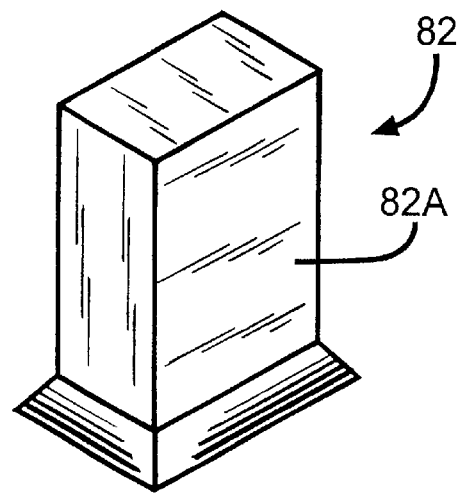
FIG. 8 is a view of a second alternate embodiment of a fastener that can be used to join the wheel rim and the wheel disc together in accordance with the present invention.

Referring now to FIG. 8, there is illustrated a third embodiment of a rivet 82 which can be used to join the wheel rim 20 and the wheel disc 40 together in accordance with the present invention. As shown therein, the rivet 82 includes a body 82A having a generally rectangular cross section.

Figure 9:
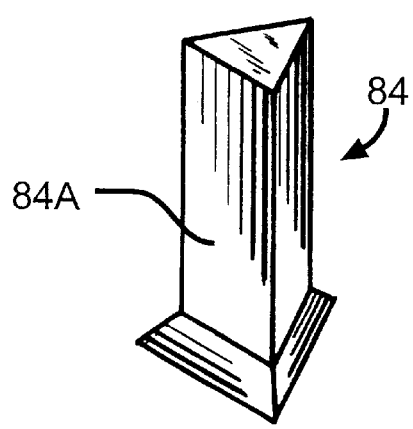
FIG. 9 is a view of a third alternate embodiment of a fastener that can be used to join the wheel rim and the wheel disc together in accordance with the present invention.

Referring now to FIG. 9, there is illustrated a fourth embodiment of a rivet 84 which can be used to join the wheel rim 20 and the wheel disc 40 together in accordance with the present invention. As shown therein, the rivet 84 includes a body 84A having a generally triangular cross section.

Figure 10:
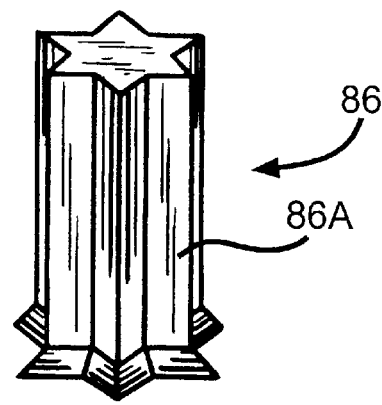
FIG. 10 is a view of a fourth alternate embodiment of a fastener that can be used to join the wheel rim and the wheel disc together in accordance with the present invention.

Referring now to FIG. 10, there is illustrated a fifth embodiment of a rivet 86 which can be used to join the wheel rim 20 and the wheel disc 40 together in accordance with the present invention. As shown therein, the rivet 86 includes a body 86A having a generally star shaped cross section.

Figure 21:
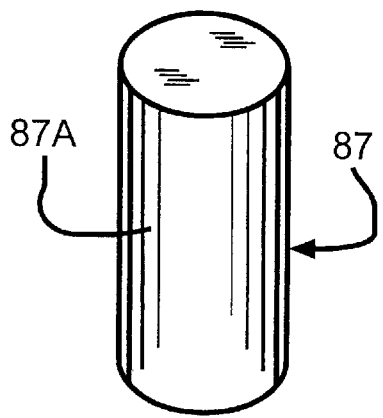
FIG. 21 is a view of a fifth alternate embodiment of a fastener that can be used to join the wheel rim and the wheel disc together in accordance with the present invention.

Referring now to FIG. 21, there is illustrated a sixth embodiment of a rivet 87 which can be used to join the wheel rim 20 and the wheel disc 40 together in accordance with the present invention. As shown therein, the rivet 87 includes a body 87A having a generally oval shaped cross section.

Figure 22:
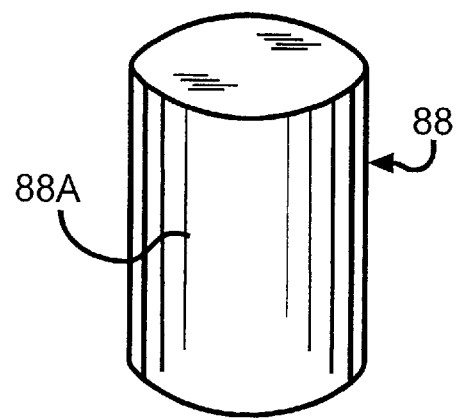
FIG. 22 is a view of a sixth alternate embodiment of a fastener that can be used to join the wheel rim and the wheel disc together in accordance with the present invention.

Referring now to FIG. 22, there is illustrated a fifth embodiment of a rivet 88 which can be used to join the wheel rim 20 and the wheel disc 40 together in accordance with the present invention. As shown therein, the rivet 88 includes a body 88A having a generally football shaped cross section.

Figure 11:
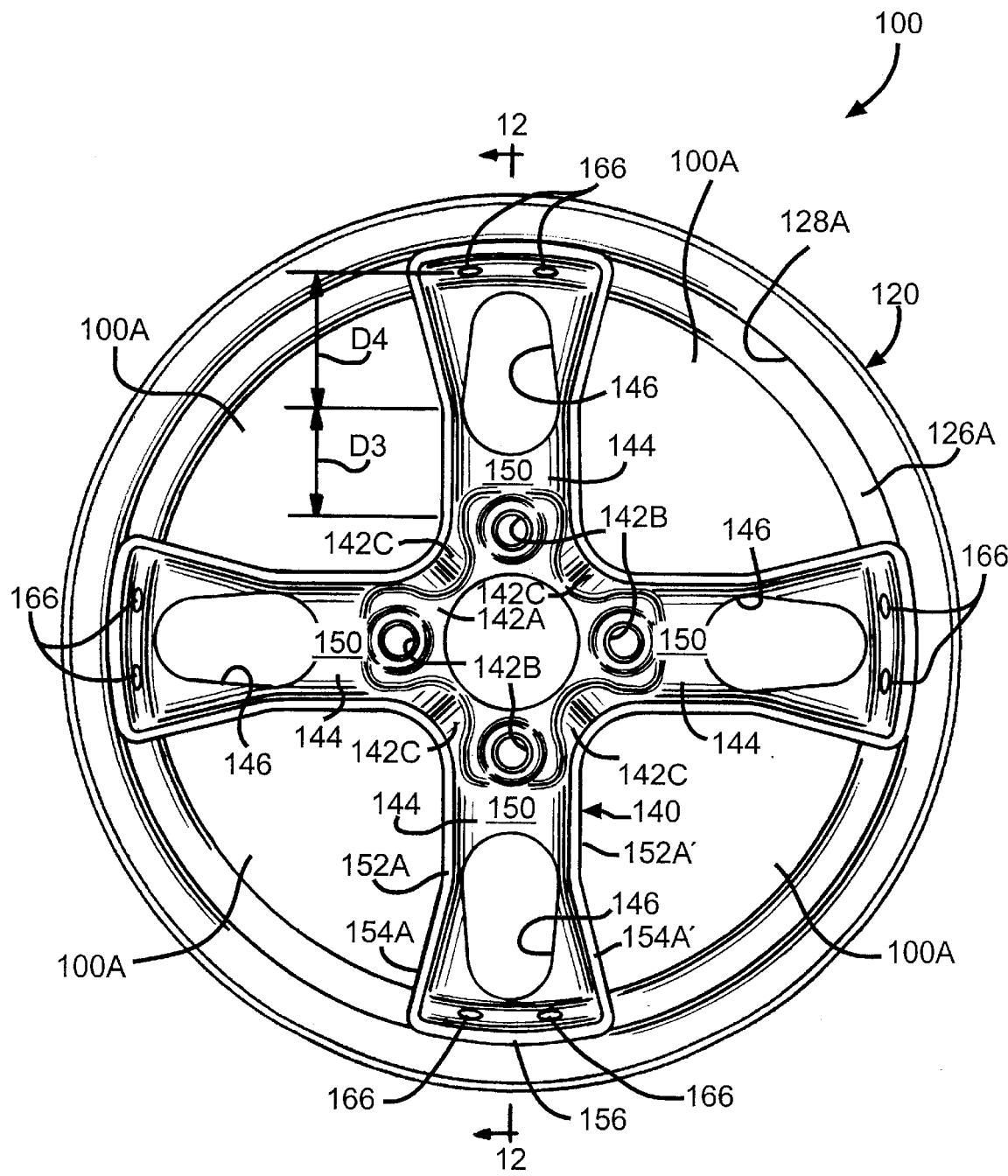
FIG. 11 is a front view illustrating a second embodiment of a fabricated vehicle wheel in accordance with the present invention.
Figure 12:
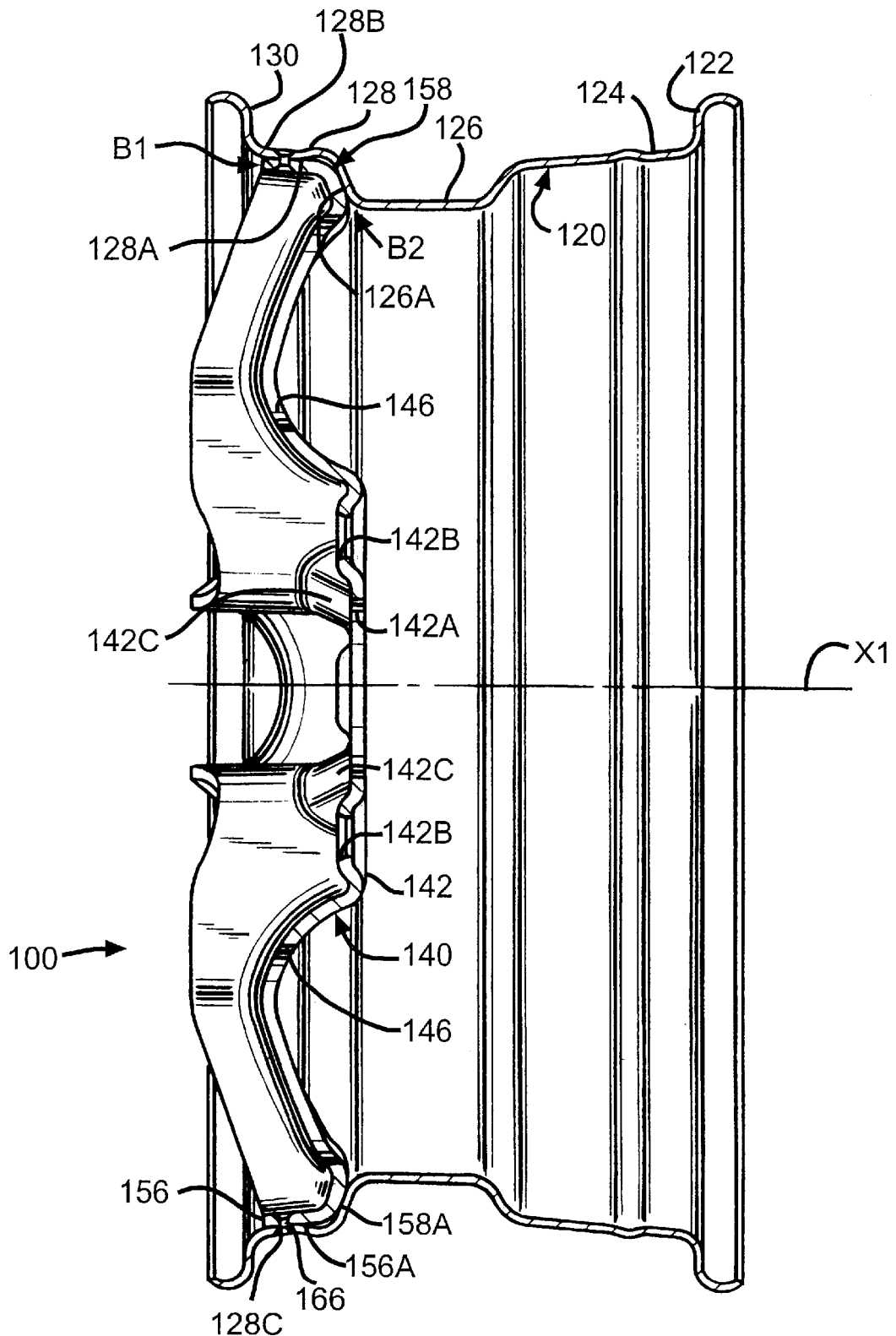
FIG. 12 is a sectional view of the vehicle wheel taken along line 12—12 of FIG. 11.
Figure 13:
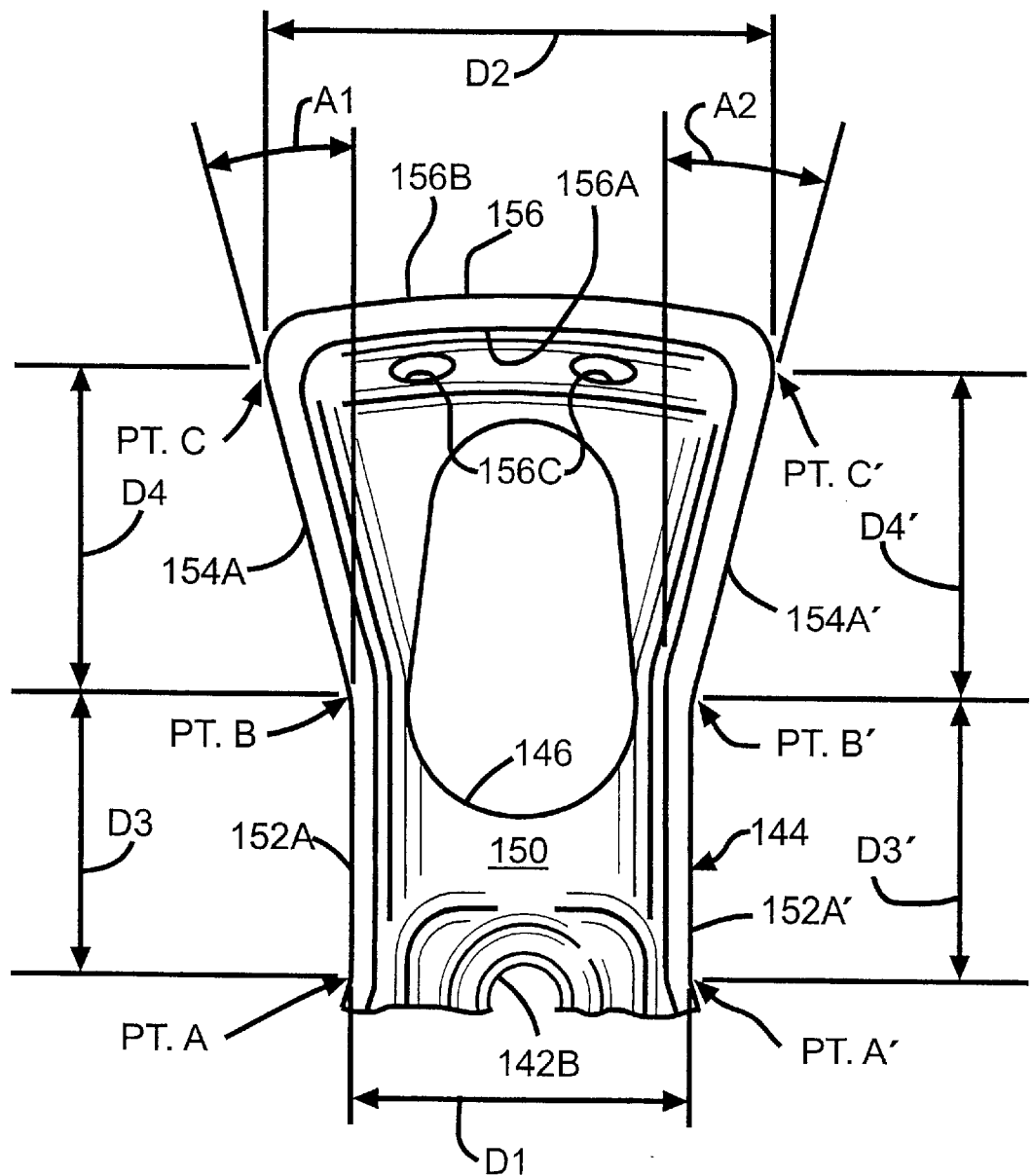
FIG. 13 is an enlarged view of a portion of the vehicle wheel illustrated in FIGS. 11 and 12.

Referring now to FIGS. 11 through 13, there is illustrated a second embodiment of a vehicle wheel, indicated generally at 100, produced in accordance with the present invention. The vehicle wheel 100 is illustrated as being a fabricated "bead seat attached" vehicle wheel. The fabricated bead seat attached vehicle wheel 100 includes a full wheel rim 120 and an inner wheel disc 140 constructed in accordance with the present invention and which are joined together by a method in accordance with the present invention. The vehicle wheel 100 defines a horizontal or longitudinal vehicle wheel axis X1.

The wheel rim 120 is a fabricated rim formed from a suitable material, such as for example, steel, aluminum or alloys thereof, magnesium, or titanium. The wheel rim 120 includes an inboard tire bead seat retaining flange 122, an inboard tire bead seat 124, a generally axially extending well 126, an outboard tire bead seat 128, and an outboard tire bead seat retaining flange 130. The well 126 includes an outer surface 126A and the outboard tire bead seat 128 includes an outer surface 128A and an inner surface 128B. The outboard tire bead seat 128 further includes a plurality of holes 28C (only two of such holes 28C shown in FIG. 12), formed therein. As will be discussed below, the holes 128C are formed by a suitable process, such as for example, by piercing, drilling, or laser cutting.

The wheel disc 140 is forged, cast, fabricated, or otherwise formed from a suitable material, such as for example, steel, aluminum or alloys thereof, steel, magnesium, or titanium. The wheel disc 140 includes a generally centrally located wheel mounting surface or portion 142 and a plurality of outwardly extending spokes 144. In the illustrated embodiment, the disc 140 includes four of such spokes 144 which are shown as being formed integral with the wheel mounting surface 142. Alternatively, the number and/or the construction of the spokes 144 can be other than illustrated if so desired. For example, the vehicle wheel 10 can include less than four spokes 144 or more than four spokes 144 and/or the spokes 144 can be formed separate from the wheel mounting surface 142 of the disc 140 and joined thereto by a suitable method.

The wheel mounting surface 142 is provided with a centrally located pilot aperture 142A and a plurality of lug bolt receiving holes 142B circumferentially spaced around the pilot aperture 142A. In the illustrated embodiment, the wheel mounting surface 142 includes four of such lug bolt receiving holes 142B which are preferably provided in the wheel mounting surface 142 "in line" with a respective one of each of the spokes 144. Alternatively, the number and/or the location of the lug bolt receiving holes 142B can be other than illustrated if so desired. The lug bolt receiving holes 142B receive lug bolts (not shown) and nuts (not shown) for securing the vehicle wheel 100 on an axle (not shown) of the vehicle. The mounting surface 142 further includes a plurality of "strengthening" ribs 142C provided therein. As best shown in FIG. 12, each of the ribs 142C is defined by a raised or embossed area which extends outwardly from or above the mounting surface 142.

Each of the spokes 144 includes an inner surface 144A and an outer surface 144B. The wheel disc 140 may also include one or more openings or windows 146 formed in one or more of each of the spokes 144. In the illustrated embodiment, one of such windows 146 is provided in each of the spokes 144. Alternatively, the number and/or the location of the windows 146 can be other than illustrated if so desired.

Each spoke 144 of the wheel disc 140 includes a generally flat rear or back wall 150, a first pair of opposed side walls 152A and 154A' extending outwardly from the rear wall 150, a second pair of opposed side walls 154A and 154A' extending outwardly from the rear wall 150, and an outermost end wall 156 extending outwardly from the rear wall 150 which defines a mounting flange. The first pair of side walls 152A and 152A' define "inner" side walls and are operative to connect the associated spoke 144 to the wheel mounting surface 142 thereof. The second pair of side walls 154A and 154A' define "outer" side walls and are disposed between the respective inner side walls 152A and 152A' and the back wall 150.

In the illustrated embodiment, the inner side walls 152A and 152A' extends generally parallel to one another and the outer side walls 154A and 154A' extend radially outwardly in a "flared" or "belled" manner relative to the inner side walls 152A and 152A', respectively, at preselected angles A1 and A2 with respect to the inner side walls 152A and 152A'. The angles A1 and A2 are illustrated as being generally the same and are in the range from about 5 degrees to about 135 degrees. In the illustrated embodiment, the angles A1 and A2 are approximately 20 degrees.

The inner side wall 152A extends a distance D3 from about a point A to about a point B, and the outer side wall 154A extends a distance D4 from about the point B to about the point C. The inner side wall 152A' extends a distance D3' from about a point A' to about a point B', and the outer side wall 154A' extends a distance D4' from about the point B' to about the point C'. In the illustrated embodiment, the distances D3 and D3' are generally the same, and the distances D4 and D4' are about the same. Also, in the illustrated embodiment, the distances D3 and D3' and the distances D4 and D4' are about the same. Alternatively, one or more of the distances D3, D3', D4 and D4' can be other than illustrated if so desired.

The inner side walls 152A and 152A' define a first spoke width or distance D1, and the outermost ends of the outer side walls 154A and 154A' define a second spoke width or distance D2 which is greater than the distance D1. Preferably, the distance D2 is at least 5 percent greater than the distance D1. More preferably, the distance D2 is at least 50 percent greater that the distance D1.

The mounting flange 156 includes an inner surface 156A and an outer surface 156B. The mounting flange 156 of each spoke 144 is connected to the rear wall 150 by a transition portion 158. The transition portion 158 has a generally curved or rounded profile which generally corresponds to the profile of the adjacent outer surface 128A of the wheel rim 120 to which it is joined. The inner surface 156A of the mounting flange 156 of the spoke 144 and the outer surface 128A of the rim 120 define a first disc to rim interface area, indicated generally at B1, and an inner surface 158A of the transition portion 158 and the outer surface 126A of the rim 120 define a second disc to rim interface area, indicated generally at B2. Preferably, there is full or complete contact between the inner surface 156A of the mounting flange 156 of the spoke 144 and the outer surface 128A of the rim 120 at the first disc to rim interface area B1, and there is also full contact between the inner surface 158A of the transition portion 158 and the outer surface 126A of the rim 120 at the second disc to rim interface area B2. However, due to manufacturing tolerances and/or other design specifications, there may be less than full contact at one or both of the interface areas B1 and B2. In the illustrated embodiment, the mounting flange 156 of each spoke 144 includes at least two holes 156C for a purpose to be discussed below.

To assemble the vehicle wheel 100 in the illustrated embodiment, the wheel rim 120 and the wheel disc 140 are located relative to one another in a predetermined positioned. In this position, the wheel rim outer surface 128A is disposed adjacent the spoke flange inner surface 156A and the outer surface 126A disposed adjacent the spoke transition inner surface 148A. While in this position, the wheel rim holes 128C and the spoke flange holes 156C are preferably formed in the rim 120 and spokes 144 at the same time by a suitable method, such as for example, by piercing, drilling or laser cutting. Forming the holes 128C and 156C in this manner ensures that the holes 128C and 156C are in proper alignment. Alternatively, the holes 128C and 156 can be separately provided in one or both of the rim 120 and spokes 144 prior to assembly if so desired.

Following this, a suitable fastener 166 is installed in each pair of the aligned holes 128C and 156C provided in each of the spokes 144 to thereby join the wheel rim 120 and the wheel disc 140 together. In the illustrated embodiment, the fastener 166 is a rivet. The rivet 166 can be of any suitable shape, such as that illustrated and described herein. Alternatively, the type, configuration, location and/or the number of fasteners 166 that are used can be other than illustrated if so desired. Preferably, as illustrated, each spoke 144 has two fasteners 166 installed therein to join the disc 140 and the wheel rim 120 together. Also, as shown in this embodiment, preferably the inner surface 158A of the transition portion 158 and the outer surface 126A of the wheel rim well 126 abut or contact one another at the second disc to rim interface area B2; however, in some instances, depending upon the uniformity of the rim 120 and/or the disc 140 or depending upon the particular vehicle wheel construction, the inner surface 158A and the outer surface 126A may not abut or contact one another along portions thereof or at all. Alternatively, an adhesive and/or a weld can be used at one or both of the first disc to rim interface area B1 and the second disc to rim interface area B2 if so desired. As can be seen in FIG. 11, due to the construction of the wheel disc 140, the resultant wheel 100 has a relatively large opening 100A formed therein between each pair of the spokes 144.

Referring now to FIGS. 14 through 17, there is illustrate a third embodiment of a fabricated vehicle wheel, indicated generally at 200, produced in accordance with the present invention. The vehicle wheel 200 produced according to this invention is illustrated as being a fabricated "bead seat attached" vehicle wheel. The fabricated bead seat attached vehicle wheel 200 includes a full wheel rim 220 and an inner wheel disc 240 which are constructed and joined together in accordance with the present invention. The vehicle wheel 200 defines a horizontal or longitudinal vehicle wheel axis X2.

The wheel rim 220 is a fabricated rim formed from a suitable material, such as for example, steel, aluminum or alloys thereof, magnesium, or titanium. The wheel rim 220 includes an inboard tire bead seat retaining flange 222, an inboard tire bead seat 224, a generally axially extending well 226, an outboard tire bead seat 228, and an outboard tire bead seat retaining flange 230. The well 226 includes an outer surface 226A and the outboard tire bead seat 228 includes an outer surface 228A and an inner surface 228B. The outboard tire bead seat 228 further includes a plurality of holes 228C (shown in FIG. 15), formed therein. As will be discussed below, the holes 228C can be formed by a suitable process, such as for example, by piercing, drilling, or laser cutting.

The wheel disc 240 is forged, cast, fabricated, or otherwise formed from a suitable material, such as for example, steel, aluminum or alloys thereof, steel, magnesium, or titanium. The wheel disc 240 includes a generally centrally located wheel mounting surface or portion 242 and a plurality of outwardly extending spokes 244. In the illustrated embodiment, the disc 240 includes five of such spokes 244 which are shown as being formed integral with the wheel mounting surface 242. Alternatively, the number and/or the construction of the spokes 244 can be other than illustrated if so desired. For example, the vehicle wheel 200 can include less than five spokes 244 or more than five spokes 244 and/or the spokes 244 can be formed separate from the wheel mounting surface 242 of the disc 240 and joined thereto by a suitable method.

The wheel mounting surface 242 is generally that portion of the disc 240 which is bounded by a circle P. However, the mounting surface 242 can be other than illustrated depending upon the particular wheel construction. The wheel mounting surface 242 is provided with a centrally located pilot aperture 242A and a plurality of lug bolt receiving holes 242B circumferentially spaced around the pilot aperture 242A. In the illustrated embodiment, the wheel mounting surface 242 includes five of such lug bolt receiving holes 242B which are preferably provided in the wheel mounting surface 242 "in line" with a respective one of each of the spokes 244. Alternatively, the number and/or the location of the lug bolt receiving holes 242B can be other than illustrated if so desired. The lug bolt receiving holes 242B receive lug bolts (not shown) and nuts (not shown) for securing the vehicle wheel 200 on an axle (not shown) of a vehicle. The mounting surface 242 further includes a plurality of "strengthening" ribs 242C provided therein.

Each of the spokes 244 includes an inner surface 244A and an outer surface 244B. The wheel disc 240 may also include one or more openings or windows 246 formed in one or more of each of the spokes 244. In the illustrated embodiment, one of such windows 246 is provided in each of the spokes 244. Alternatively, the number and/or the location of the windows 246 can be other than illustrated if so desired.

Each spoke 244 of the wheel disc 240 includes a generally flat rear or back wall 250, a pair of opposed side walls 252 and 254 extending outwardly from the rear wall 250, and an outermost end wall 256 extending outwardly from the rear wall 250 which defines a mounting flange. The side walls 252 and 254 are operative to connect the associated spoke 244 to the wheel mounting surface 242 thereof. In the illustrated embodiment, the side walls 252 and 254 extend generally parallel to one another and define a uniform or unvarying spoke width therebetween. Alternatively, the structure of one or both of the spoke side walls 252 and 254 can be other than illustrated if so desired.

The mounting flange 256 includes an inner surface 256A and an outer surface 256B. The mounting flange 256 of each spoke 244 is connected to the rear wall 250 by a transition portion 258. The transition portion 258 has a generally curved or rounded profile which generally corresponds to the profile of the adjacent outer surface 228A of the wheel rim 220 to which it is joined. The inner surface 256A of the mounting flange 256 of the spoke 244 and the outer surface 228A of the rim 220 define a first disc to rim interface area, indicated generally at C1, and an inner surface 258A of the transition portion 258 and the outer surface 226A of the rim 220 define a second disc to rim interface area, indicated generally at C2. Preferably, there is full or complete contact between the inner surface 256A of the mounting flange 256 of the spoke 244 and the outer surface 228A of the rim 220 at the first disc to rim interface area C1, and there is also full contact between the inner surface 258A of the transition portion 258 and the outer surface 226A of the rim 220 at the second disc to rim interface area C2. However, due to manufacturing tolerances and/or other design specifications, there may be less than full contact at one or both of the interface areas C1 and C2. In the illustrated embodiment, the mounting flange 256 of each spoke 244 is provided with a hole 256C (or holes) for a purpose to be discussed below.

Figure 17:
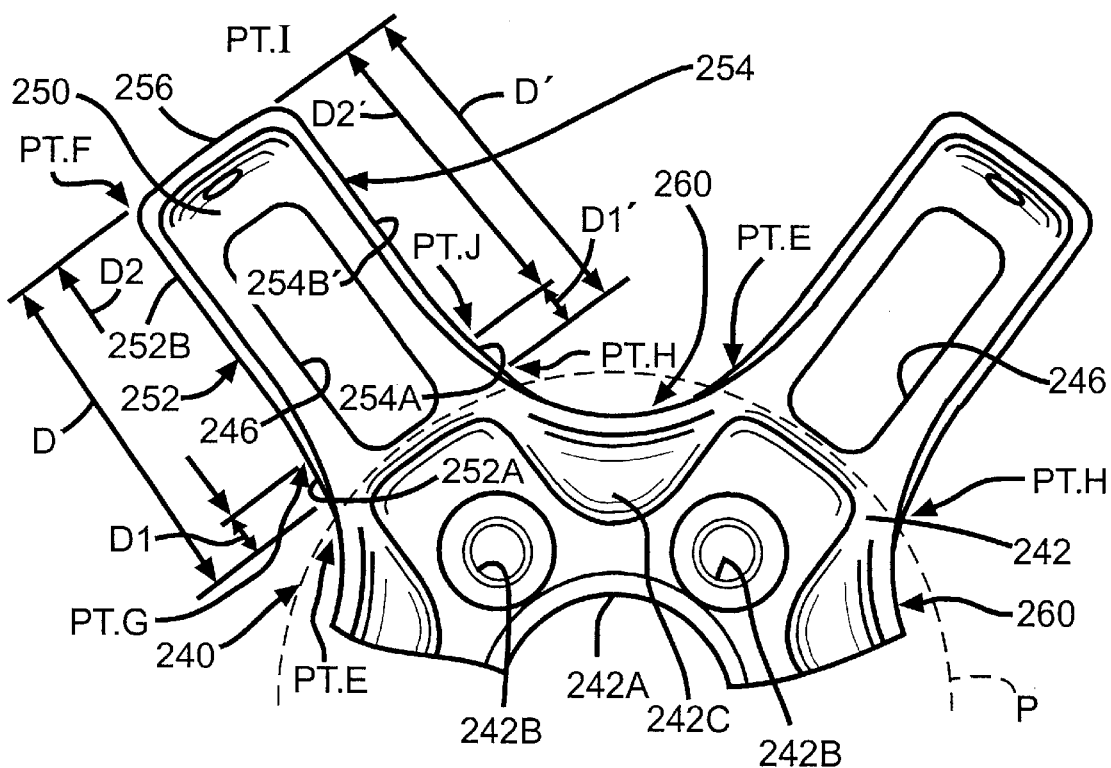
FIG. 17 is an enlarged view of a portion of the vehicle wheel illustrated in FIGS. 14 and 15.

As best shown in FIG. 17, the side wall 252 extends a total distance D from about a point E to about a point F. The point E is located at the transition from the wheel mounting surface 242 to the spoke side wall 252, and the point F is located at the transition from the spoke side wall 252 to the end wall 256. Similarly, the side wall 254 extend a total distance D' from about a point H to about a point I. The point H is located at the transition from the wheel mounting surface 242 to the spoke side wall 254, and the point I is located at the transition from the spoke side wall 254 to the end wall 256.

The side wall 252 includes a generally flared or curved non-uniform first or inner side wall portion 252A defined throughout a distance D1 from about the point E to about a point G, and a generally uniform second or outer side wall portion 252B defined throughout a distance D2 from about the point G to about the point F. Similarly, the side wall 254 includes a generally flared or curved non-uniform first or inner side wall portion 254A defined throughout a distance D1' from about the point H to about a point J, and a generally uniform second or outer side wall portion 254B defined throughout a distance D2' from about the point J to about the point I.

Figure 16:
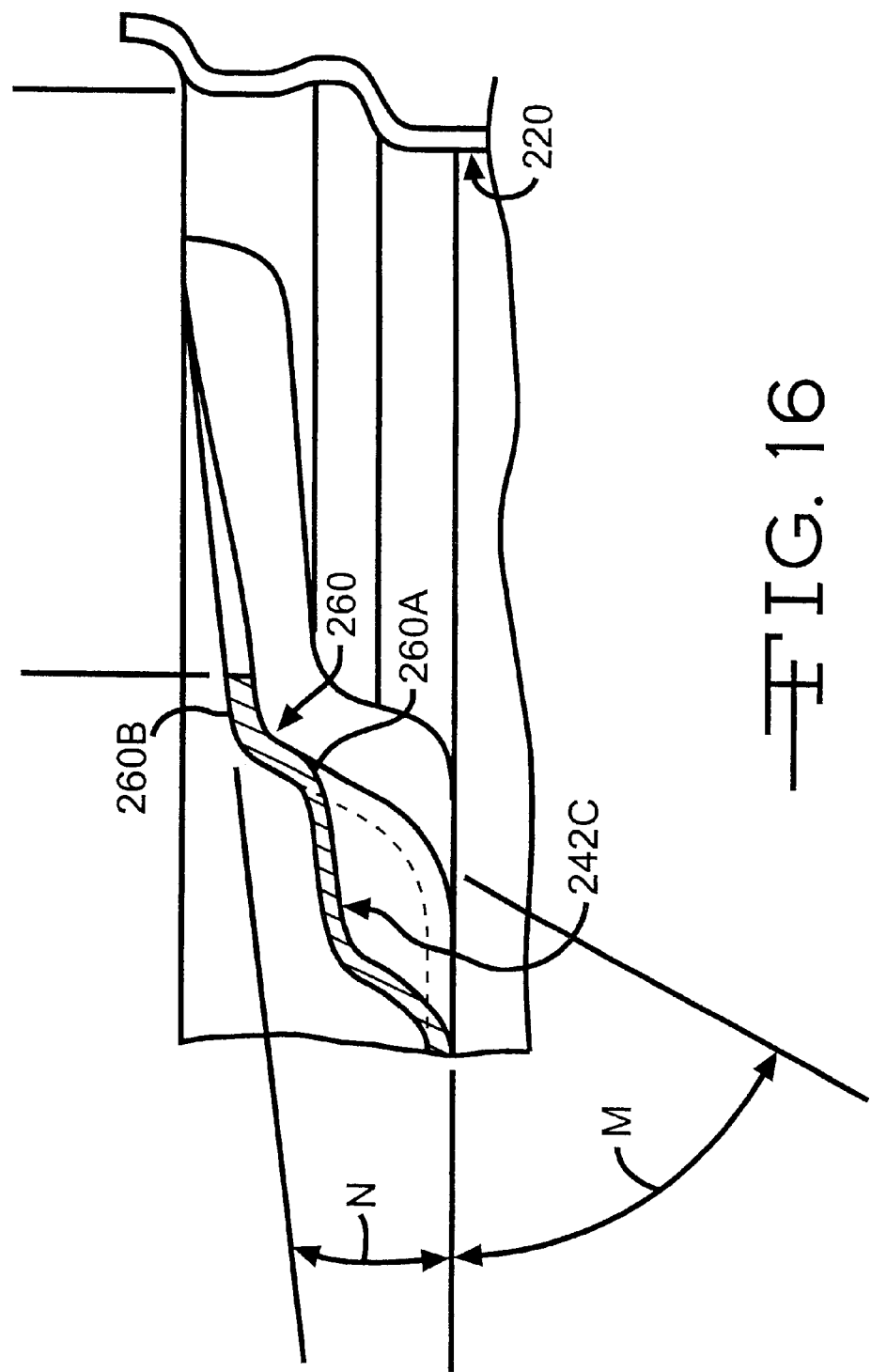
FIG. 16 is a sectional view of the vehicle wheel taken along line 16—16 of FIG. 14.

The mounting surface 242 of the disc 240 includes a section, indicated generally at 260 and best shown in the top middle portion of FIG. 17, which extends between each pair of spokes 244 between the points H and E. As shown in FIG. 16, the disc section 260 includes a transition or intermediate wall 260A and a front or outer wall 260B. The transition wall 260A is slightly curved and extends generally radially outwardly with respect to back wall 242C of the mounting surface 242. The front wall 260B extends generally in the same plane or parallel with respect to the back wall 242C of the mounting surface 242 although not perfectly parallel in this embodiment. Thus, it can be seen that the front wall 260B extends or projects substantially in the same plane as the mounting surface 242 of the disc 240 and then, at approximately points E and H smoothly changes direction and extends generally perpendicular to the mounting surface 242 so as to smoothly transform or blend into the side walls 252 and 254 of the spoke 244. Also, in this embodiment, the points E and H of each spoke 244 are generally located along the circle P.

As shown in FIG. 16, the intermediate wall 260A extends at an angle M relative to the mounting surface back wall 242C, and the front wall 260B extends at an angle N relative to the mounting surface back wall 242C. The angle M is in the range from about 5 degrees to about 85 degrees and the angle N is in the range from about 0 degrees to about 30 degrees. In the illustrated embodiment, the angle M is preferably about 65 degrees and the angle N is preferably about 5 degrees. Alternatively, and angles M and N can be other than illustrated if so desired.

To assemble the vehicle wheel 200 in the illustrated embodiment, a suitable adhesive (not shown) is preferably first applied to at least the outer surface 228A of the rim 220. Preferably, the adhesive is applied around substantially the entire periphery of the outer surface 228A of the wheel rim 220. Alternatively, the application of the adhesive can be other than described if so desired.

Next, the wheel rim 220 and the wheel disc 240 are located relative to one another in a predetermined position. In this position, the wheel rim outer surface 228A is disposed adjacent the spoke flange inner surface 256A and the rim outer surface 226A disposed adjacent the spoke transition inner surface 258A. While in this position, the wheel rim holes 228C and the spoke flange holes 256C are preferably formed in the rim 220 and spokes 244 at the same time by a suitable method, such as for example, by piercing, drilling or laser cutting. Forming the holes 228C and 256C in this manner ensures that the holes 228C and 256C are in proper alignment. Alternatively, the holes 228C and 256C can be separately provided in one or both of the rim 220 and spokes 244 prior to assembly if so desired.

Figure 14:
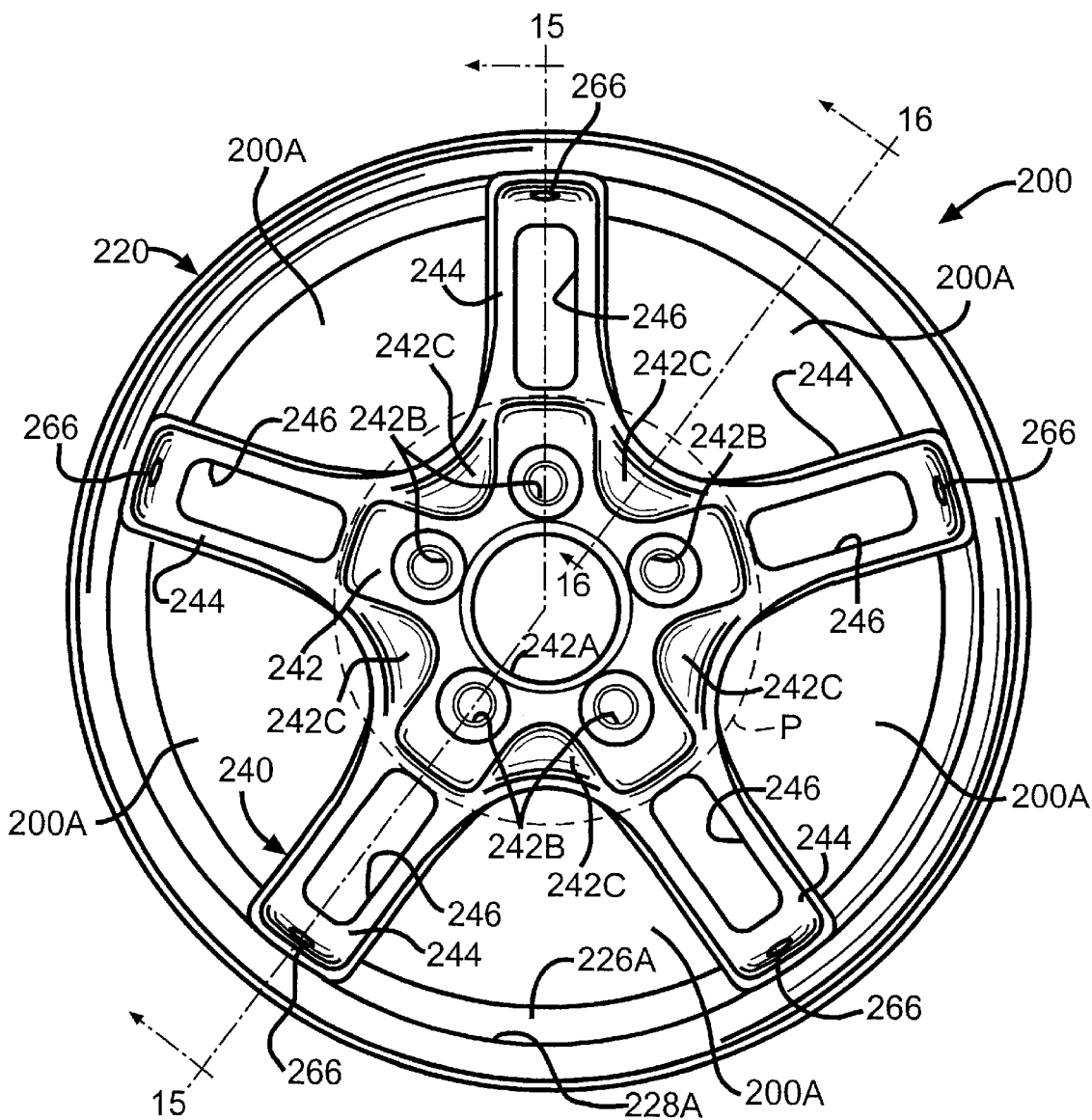
FIG. 14 is a front view of a third embodiment of a fabricated vehicle wheel in accordance with the present invention.
Figure 15:
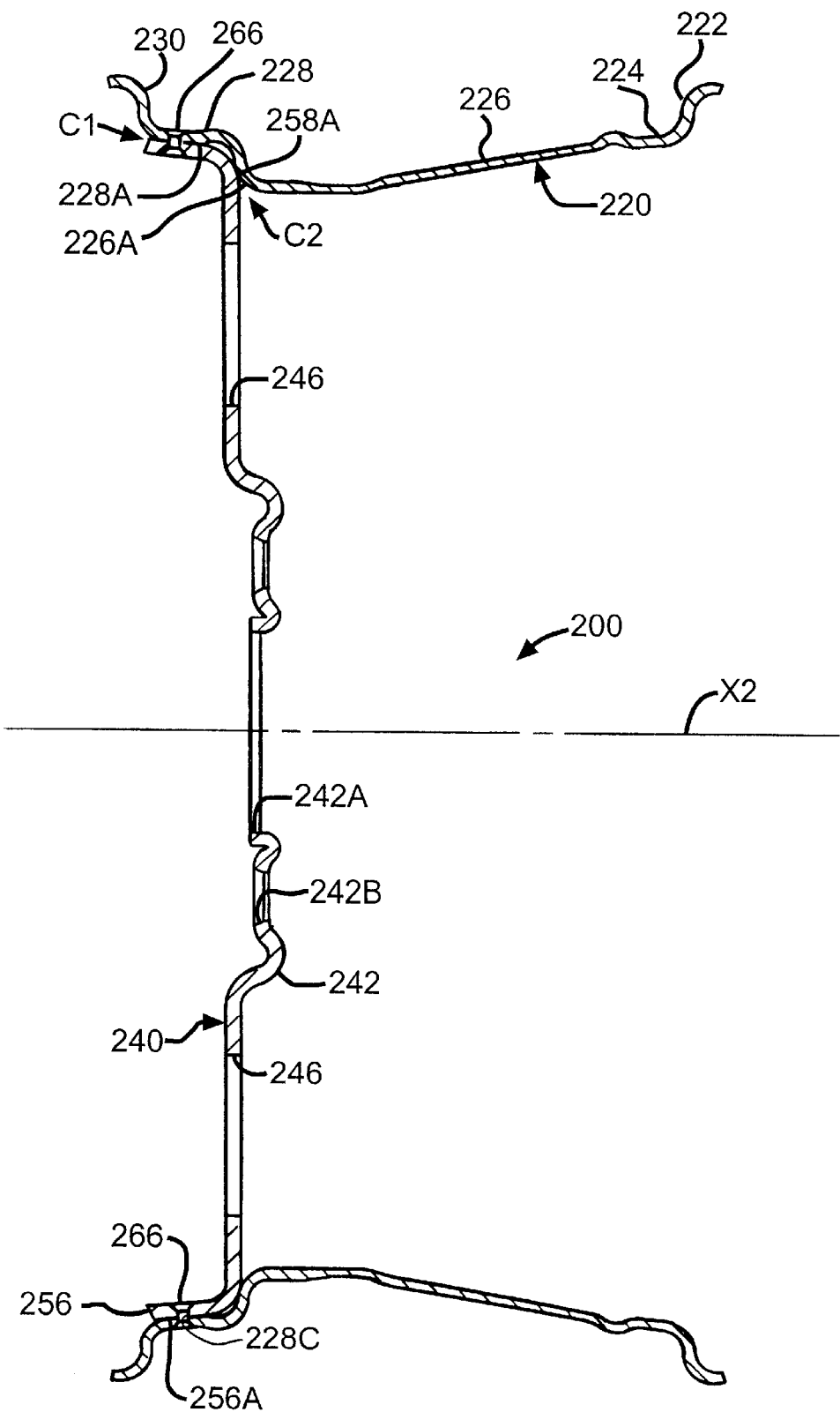
FIG. 15 is a sectional view of the vehicle wheel taken along line 15—15 of FIG. 14.

Following this, a suitable fastener 266 is installed in each of the aligned holes 228C and 256C to thereby join the wheel rim 220 and the wheel disc 240 together. Alternatively, the type, configuration, location and/or the number of fasteners 266 that are used can be other than illustrated if so desired. Also, as shown in this embodiment, preferably the inner surface 258A of the transition portion 258 and the outer surface 226A of the wheel rim well 226 abut or contact one another at a second disc to rim interface area C2; however, in some instances, depending upon the uniformity of the rim 220 and/or the disc 240 or depending upon the particular vehicle wheel construction, the inner surface 258A and the outer surface 226A may not abut or contact one another along portions thereof or at all. As can be seen in FIG. 14, due to the construction of the wheel disc 240, the resultant wheel 200 has relatively large openings 200A formed therein between each pair of the spokes 244.

Figure 18:
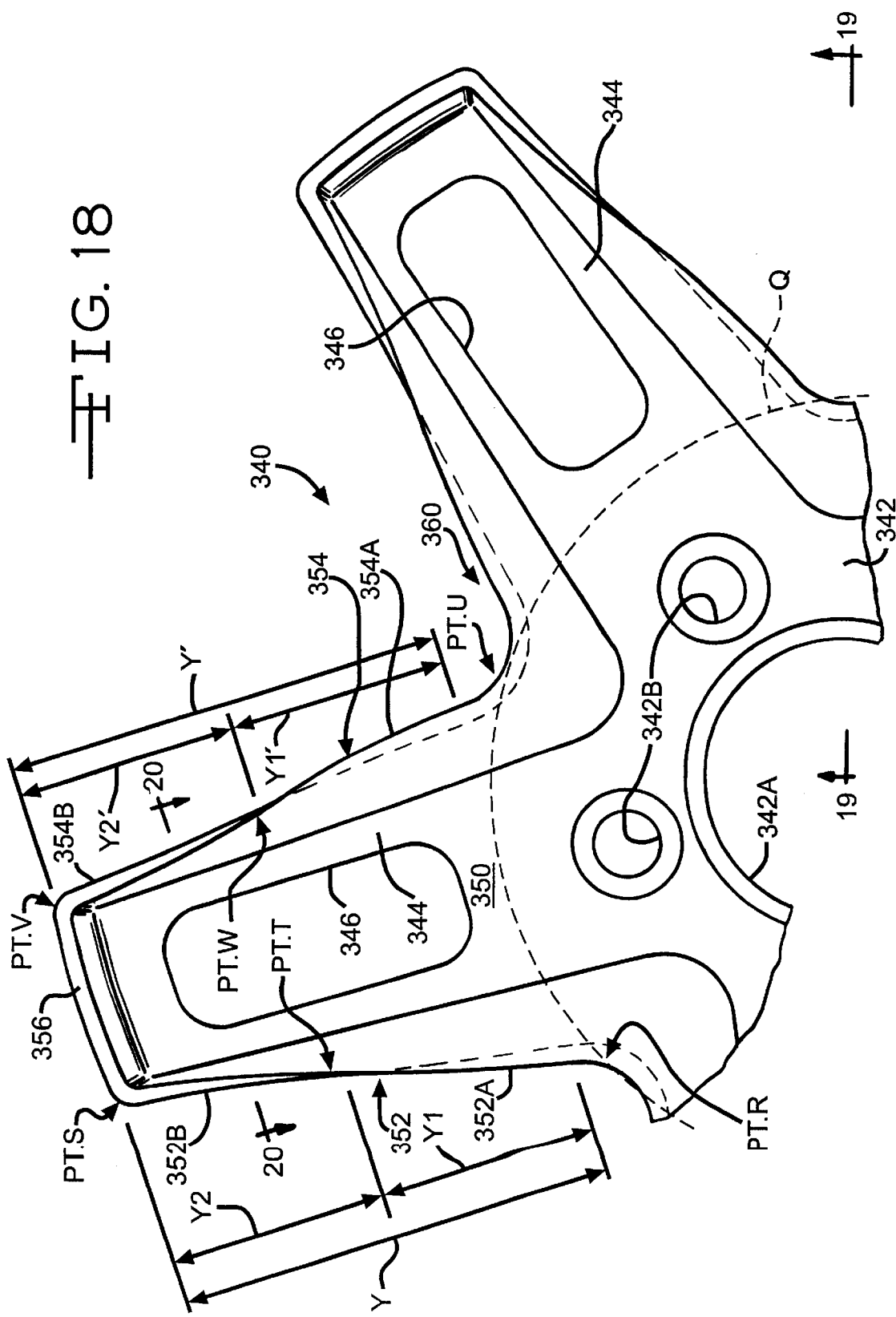
FIG. 18 is an enlarged view of a portion of a fourth embodiment of a fabricated vehicle wheel in accordance with the present invention.
Figure 19:
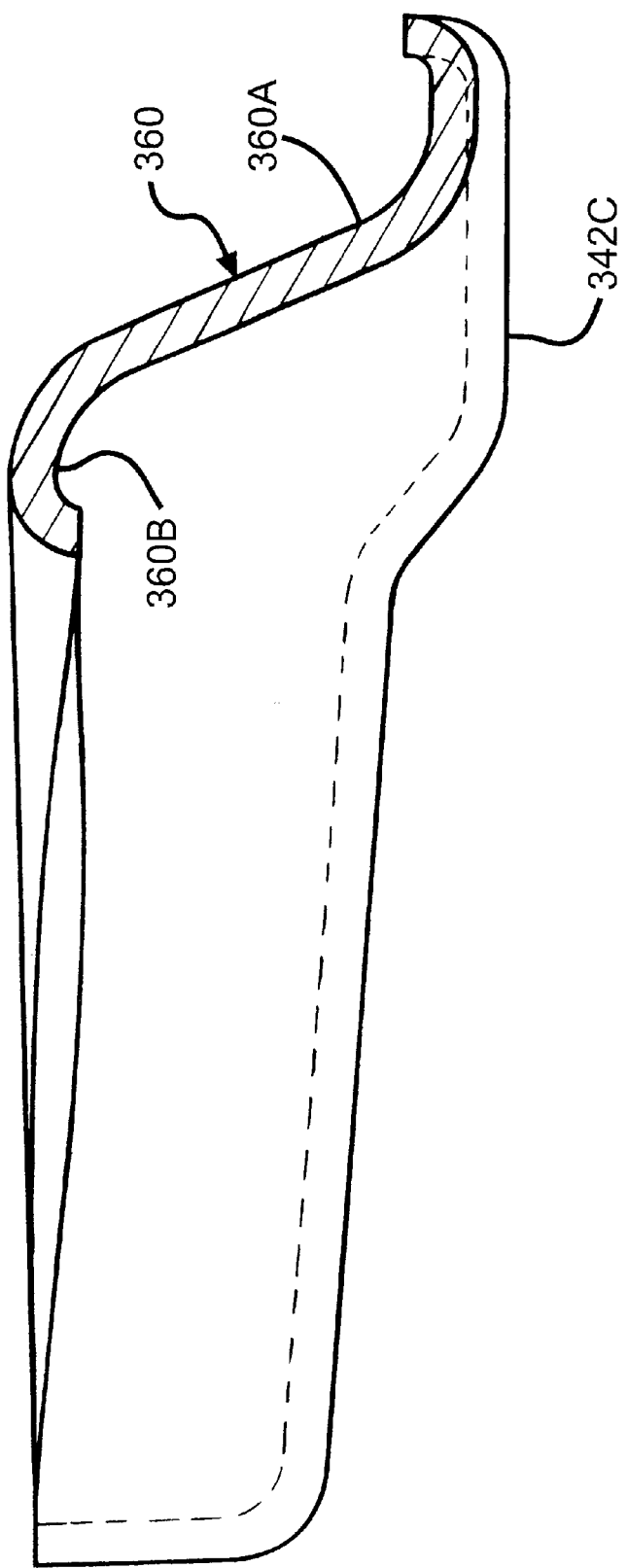
FIG. 19 is a sectional view of the vehicle wheel taken along line 19—19 of FIG. 18.
Figure 20:
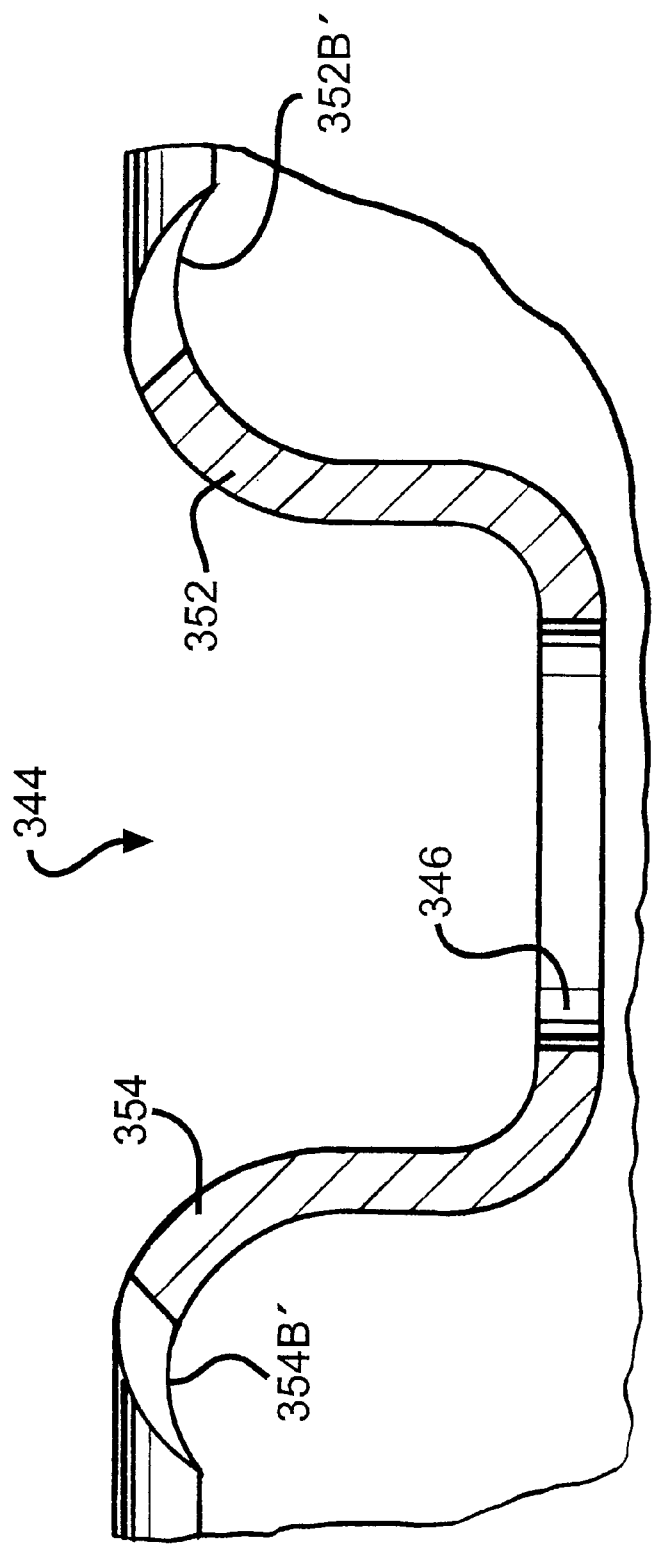
FIG. 20 is a sectional view of the vehicle wheel taken along line 20—20 of FIG. 18.

Referring now to FIGS. 18 through 20, there is illustrated a portion of a fourth embodiment of a wheel disc, indicated generally at 340, for use in a vehicle wheel in accordance with the present invention. The wheel disc 340 is forged, cast, fabricated, or otherwise formed from a suitable material, such as for example, steel, aluminum or alloys thereof, steel, magnesium, or titanium. The wheel disc 340 includes a generally centrally located wheel mounting surface or portion 342 and a plurality of outwardly extending spokes 344. In the illustrated embodiment, the spokes 344 are shown as being formed integral with the wheel mounting surface 342. Alternatively, the construction of the spokes 344 can be other than illustrated if so desired. For example, the spokes 344 can be formed separate from the wheel mounting surface 342 of the disc 340 and joined thereto by a suitable method.

The wheel mounting surface 342 is generally that portion of the disc 340 which is bounded by a circle Q. However, the mounting surface 342 can be other than illustrated depending upon the particular wheel construction. The wheel mounting surface 342 is provided with a centrally located pilot aperture 342A and a plurality of lug bolt receiving holes 342B circumferentially spaced around the pilot aperture 342A. In the illustrated embodiment, the lug bolt receiving holes 342B are preferably provided in the wheel mounting surface 342 "in line" with a respective one of each of the spokes 344. Alternatively, the location of the lug bolt receiving holes 342B can be other than illustrated if so desired. The lug bolt receiving holes 342B receive lug bolts (not shown) and nuts (not shown) for securing the associated vehicle wheel on an axle (not shown) of a vehicle. The wheel disc 340 may also include one or more openings or windows 346 formed in one or more of each of the spokes 344. In the illustrated embodiment, one of such windows 346 is provided in each of the spokes 344. Alternatively, the number and/or the location of the windows 346 can be other than illustrated if so desired.

Each spoke 344 of the wheel disc 340 includes a generally flat rear or back wall 350, a pair of opposed side walls 352 and 354 extending outwardly from the rear wall 350, and an outermost end wall 356 extending outwardly from the rear wall 350 which defines a mounting flange. The side walls 352 and 354 are operative to connect the associated spoke 344 to the wheel mounting surface 342 thereof. Preferably, the edges of the side walls 352 and 354 are coined. Alternatively, the structure of the spokes 344 can be other than illustrated if so desired.

As best shown in FIG. 18, the side wall 352 extends a total distance Y from about a point R to about a point S. The point R is located at the transition from the wheel mounting surface 342 to the spoke side wall 352, and the point S is located at the transition from the spoke side wall 352 to the end wall 356. The side wall 354 extends a total distance Y' from about a point U to about a point V. The point U is located at the transition from the wheel mounting surface 342 to the spoke side wall 354, and the point V is located at the transition from the spoke side wall 354 to the end wall 356.

The side wall 352 includes a varying or non-uniform first or inner side wall portion 352A defined throughout a distance Y1 from about the point R to about a point T, and a generally varying or non-uniform second or outer side wall portion 352B defined throughout a distance Y2 from about the point T to about the point S. The side wall 354 includes a varying or non-uniform first or inner side wall portion 354A defined throughout a distance Y1' from about the point U to about a point W, and a generally varying or non-uniform second or outer side wall portion 354B defined throughout a distance Y2' from about the point W to about the point V.

The mounting surface 342 of the disc 340 includes a section, indicated generally at 360 and best shown in the top middle portion of FIG. 18, which extends between each pair of spokes 344 between the points R and U. As shown in FIG. 19, the disc section 360 includes a transition or intermediate wall 360A and a front or outer wall 360B. The transition wall 360A is slightly curled or rolled over and extends generally radially outwardly with respect to back wall 342C of the mounting surface 342. The front wall 360B is rolled over or curled so as to extend generally back toward the mounting surface 342.

Also, as shown in this embodiment, a portion of the inner side wall portion 352A includes an outer wall 352A' which is slightly curled over as shown in FIG. 20. Similarly, a portion of the inner side wall portion 354A includes an outer wall 354A' which is slightly curled over. Thus, it can be seen that in the embodiment shown in FIGS. 18–20, that the mounting surface 342 of the disc 340 and at least portions of the side walls 352 and 354 of the spoke 344 include portions which extends generally parallel with respect the back wall 342A of the mounting surface 342. In the embodiment shown in FIGS. 14 through 17, only the mounting surface 242 of the disc 240 included portions which extended generally parallel with respect the back wall 242A of the mounting surface 242. In addition, in the embodiment shown in FIGS. 18 through 20, such portions are further rolled over and extend back toward the mounting surface 342. Alternatively, such portions in FIGS. 14 through 17 could be rolled over such as in FIGS. 18 through 20.

Figure 23:
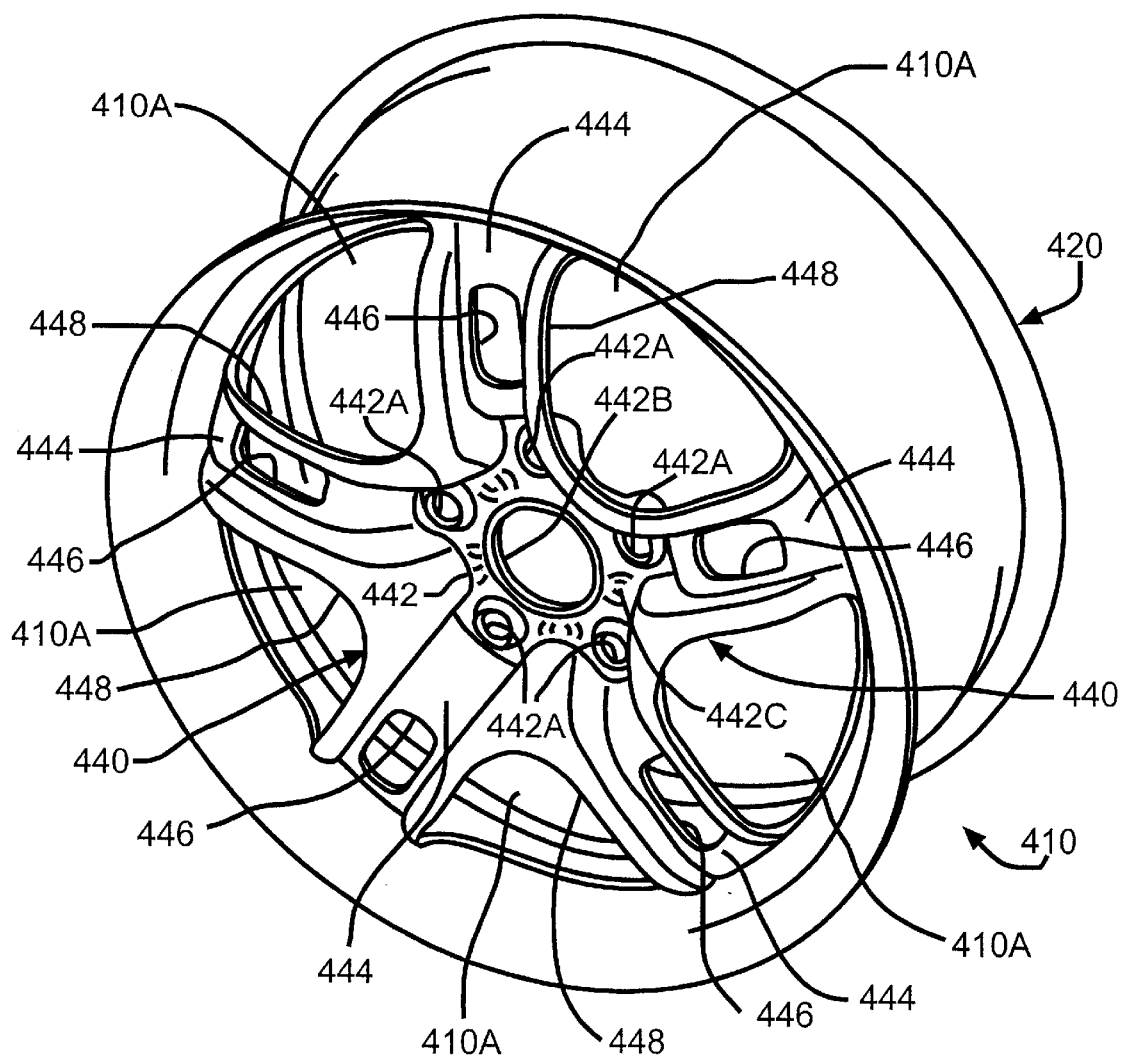
FIG. 23 is a view of a fifth embodiment of a fabricated vehicle wheel in accordance with the present invention.
Figure 24:
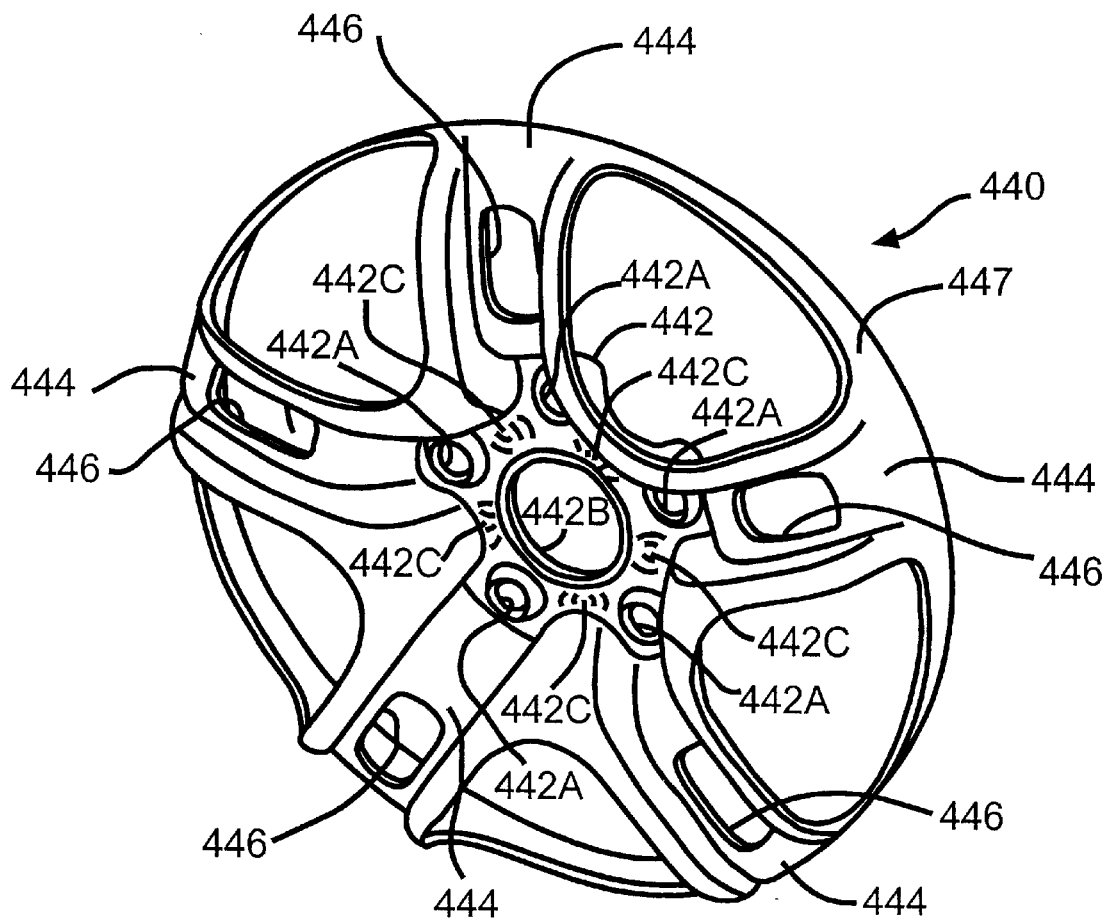
FIG. 24 is a view of the wheel disc illustrated in FIG. 23.
Figure 25:
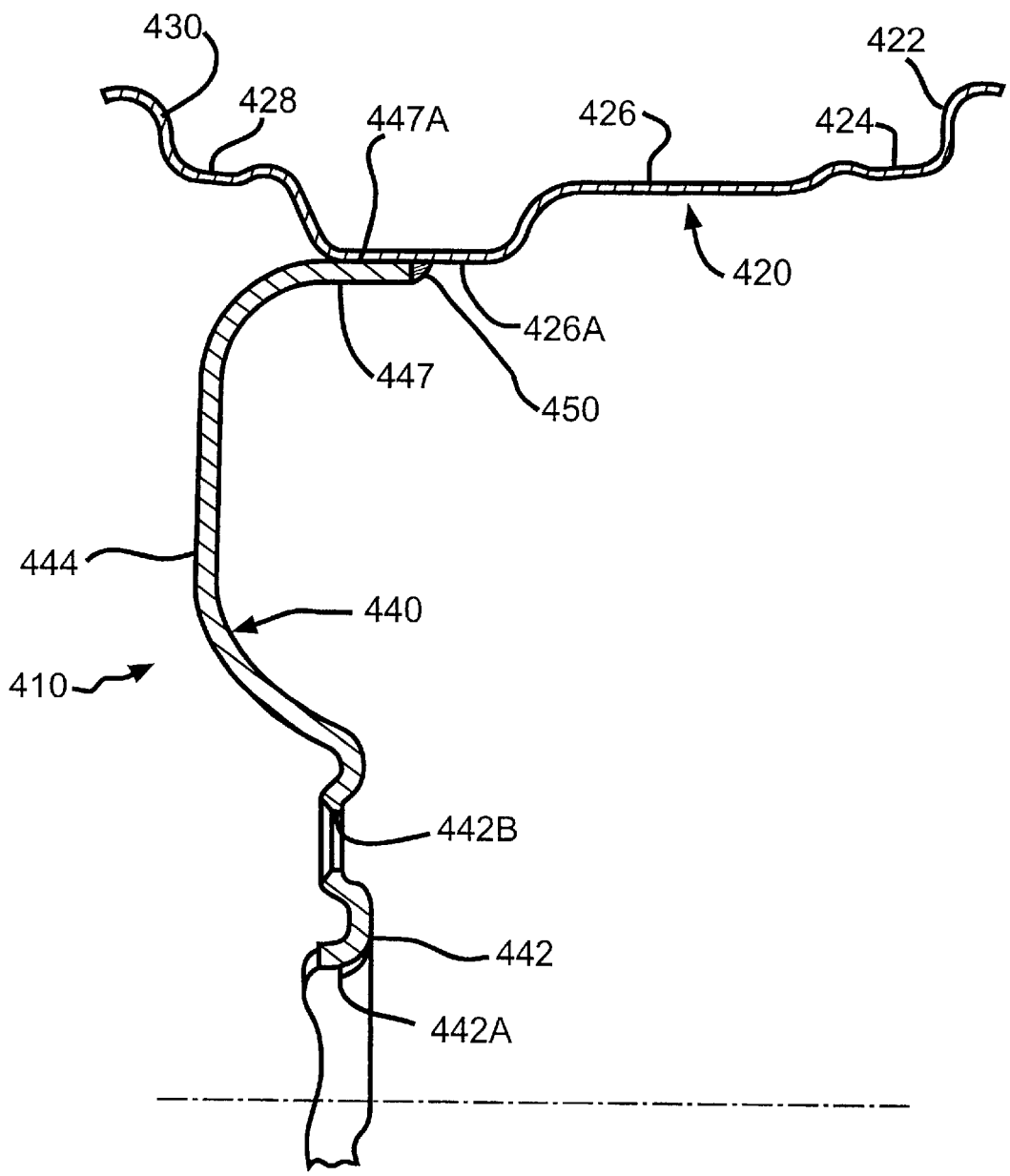
FIG. 25 is a sectional view of a portion of the vehicle wheel illustrated in FIG. 23.

Referring now to FIGS. 23–25, there is illustrated a fifth embodiment of a fabricated vehicle wheel, indicated generally at 410, produced in accordance with the present invention. The vehicle wheel 410 produced according to this invention is illustrated as being a fabricated drop center or well attached vehicle wheel. The fabricated bead drop center vehicle wheel 410 includes a full wheel rim 420 and an inner wheel disc 440 which are constructed and joined together in accordance with the present invention.

The wheel rim 420 is a fabricated rim formed from a suitable material, such as for example, steel, aluminum or alloys thereof, magnesium, or titanium. As shown in FIG. 25, the wheel rim 420 includes an inboard tire bead seat retaining flange 422, an inboard tire bead seat (not shown), a generally axially extending well 426, an outboard tire bead seat 428, and an outboard tire bead seat retaining flange 430. The well 426 includes an inner surface 426A.

The wheel disc 440 is forged, cast, fabricated, or otherwise formed from a suitable material, such as for example, steel, aluminum or alloys thereof, steel, magnesium, or titanium. The wheel disc 440 includes a generally centrally located wheel mounting surface or portion 442, a plurality of outwardly extending spokes 444, and an outer band or flange 447. In the illustrated embodiment, the disc 440 includes five of such spokes 444 which are shown as being formed integral with the wheel mounting surface 442 and the outer flange 447. Alternatively, the number and/or the construction of the spokes 444 can be other than illustrated if so desired. For example, the vehicle wheel 410 can include less than five spokes 444 or more than five spokes 444. Also, the spokes 444 and the outer flange 447 can be formed integral with one another but separate from the wheel mounting surface 442 of the disc 440 and joined thereto by a suitable method.

The wheel mounting surface 442 is provided with a centrally located pilot aperture 442A and a plurality of lug bolt receiving holes 442B circumferentially spaced around the pilot aperture 442A. In the illustrated embodiment, the wheel mounting surface 442 includes five of such lug bolt receiving holes 442B which are preferably provided in the wheel mounting surface 442 in line with a respective one of each of the spokes 444. Alternatively, the number and/or the location of the lug bolt receiving holes 442B can be other than illustrated if so desired. The lug bolt receiving holes 442B receive lug bolts (not shown) and nuts (not shown) for securing the vehicle wheel 410 on an axle (not shown) of a vehicle.

The mounting surface 442 further includes a plurality of strengthening ribs 442C provided therein. In the illustrated embodiment, a rib 442C is located between each pair of lug bolt receiving holes 442B. Each of the ribs 442C is defined by a raised or embossed area which extends outwardly from or above the mounting surface 442. The ribs 442C are operative to strengthen the mounting surface 442 to keep it from flexing during vehicle operation thereby improving the fatigue life of the associated vehicle wheel. Alternatively, the spacing, location, number and/or configuration of the ribs 442C can be other than illustrated and described if so desired.

The wheel disc 440 may also include one or more openings or windows 446 formed in one or more of each of the spokes 444. In the illustrated embodiment, one of such windows 446 is provided in each of the spokes 444. Alternatively, the number and/or the location of the windows 446 can be other than illustrated if so desired. The outer flange 447 defines an annular mounting flange and includes an outer surface 447A.

To assemble the vehicle wheel 410 in the illustrated embodiment, the wheel rim 420 and the wheel disc 440 are located relative to one another in a predetermined position. In particular, the outer surface 447A of the mounting flange 447 is positioned adjacent with inner surface 426A of the well 426 of the wheel rim 420 and a weld 45 (shown in FIG. 25) is applied to join the wheel disc 440 and the wheel rim 420 together to produce the fabricated well attached vehicle wheel. As can be seen in FIG. 23, due to the construction of the wheel disc 440, the resultant wheel 410 has a relatively large opening 410A formed therein between each pair of the spokes 444. Also, while the wheel disc 440 is shown for use in constructing a fabricated well attached vehicle wheel, the wheel disc 440 could be used to produce other types of fabricated vehicle wheels. For example, the wheel disc 440 could be used to produce a fabricated bead seat attached vehicle wheel or a fabricated full face vehicle wheel.

Figure 26:
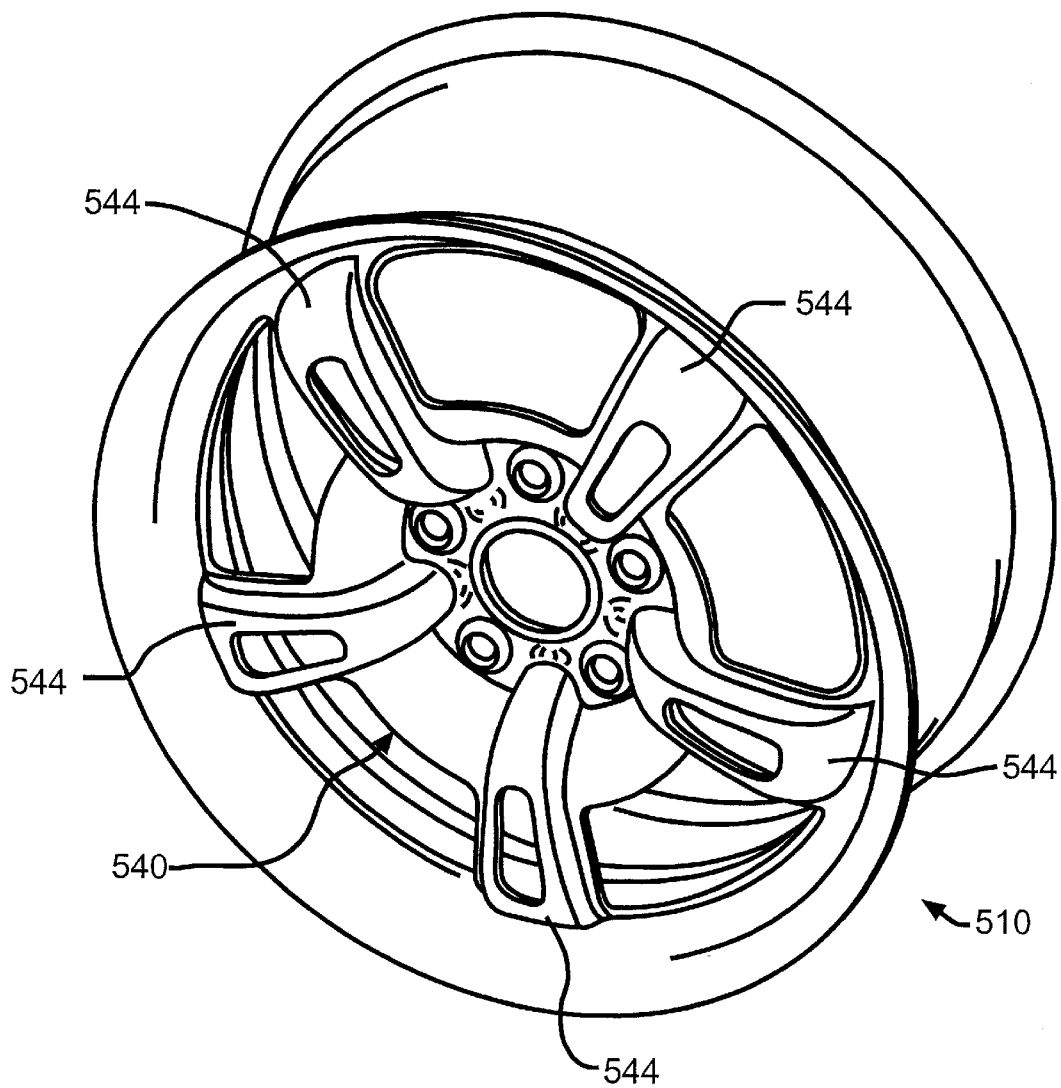
FIG. 26 is a view of a sixth embodiment of a fabricated vehicle wheel in accordance with the present invention.
Figure 27:
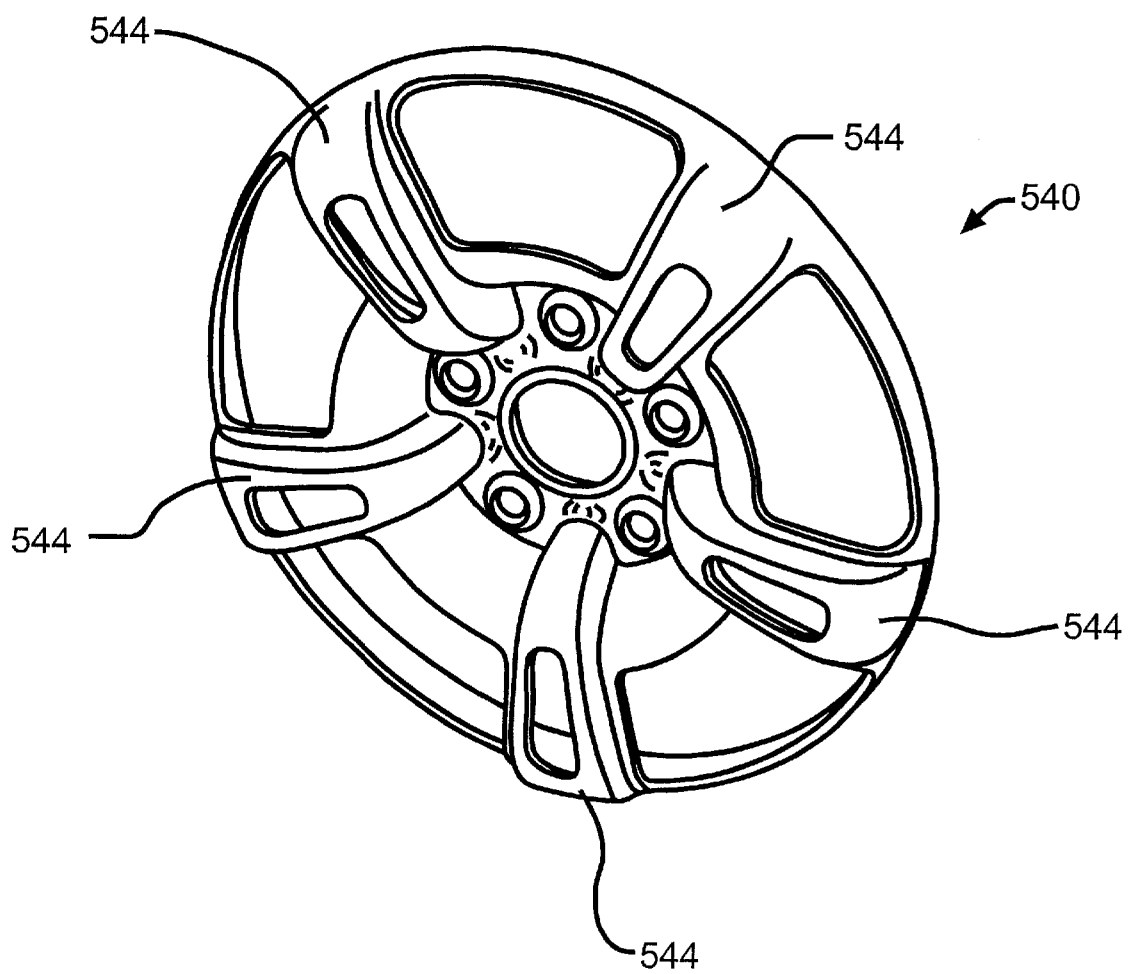
FIG. 27 is a view of the wheel disc illustrated in FIG. 25.

Referring now to FIGS. 26 and 27, there is illustrated a sixth embodiment of a fabricated vehicle wheel, indicated generally at 510, produced in accordance with the present invention. The vehicle wheel 510 produced according to this invention is illustrated as being a fabricated drop center vehicle wheel. In this embodiment, spokes 544 of a wheel disc 540 are inverted or reversed compared to the spokes 444 of the wheel disc 440 of the vehicle wheel 410 illustrated in FIGS. 23–25. Thus, in this embodiment, the spokes 544 of the wheel disc 540 project outwardly as opposed to the spokes 444 of the wheel disc 440 which project inwardly.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A fabricated vehicle wheel comprising:
   a wheel rim having a plurality of holes formed therein;
   a wheel disc having a central mounting surface and a plurality of outwardly extending spokes, each of said spokes having at least two holes formed therein;
   at least one rim to disc interface area provided along each of said spokes wherein some portion of a surface of said rim and some portion of a surface of said spoke contact one another; and
   a fastener extending through each of said at least two holes of each of said spokes and through an associated at least two holes of said plurality of holes of said rim to secure said rim and disc together;
   wherein at least one of said spokes includes a rear wall, a pair of opposed side walls extending from said rear wall, and an outermost end wall which defines a mounting flange, said pair of opposed side walls including a first pair of inner side walls and a second pair of outer side walls, said inner side walls extending generally parallel to one another and said outer side walls extending radially outwardly relative to said inner side walls at preselected angles.

2. The fabricated vehicle wheel according to claim 1 wherein at least one of said spokes includes at least one window formed therein.

3. The fabricated vehicle wheel according to claim 1 wherein said inner side walls extend a first radial distance and said outer side walls extend a second radial distance, the first and second radial distances being generally the same.

4. The fabricated vehicle wheel according to claim 1 wherein said inner side walls extend a first radial distance and said outer side walls extend a second radial distance, the first and second radial distances being different.

5. The fabricated vehicle wheel according to claim 1 wherein said inner side walls define a first spoke width and outermost ends of said outer side walls define a second spoke width is greater than said first spoke width.

6. The fabricated vehicle wheel according to claim 5 wherein said second spoke width is at least 5 percent greater than said first spoke width.

7. The fabricated vehicle wheel according to claim 5 wherein said second spoke width is at least 50 percent greater than said first spoke width.

8. The fabricated vehicle wheel according to claim 1 wherein said fastener is a rivet.

9. The fabricated vehicle wheel according to claim 1 wherein said holes formed in said spokes and said rim are formed by one of a piercing, drilling or laser cuffing method.

10. The fabricated vehicle wheel according to claim 1 wherein two spaced apart rim to disc interface areas are provided.

11. A fabricated vehicle wheel comprising:
    a wheel rim having a plurality of holes formed therein;
    a wheel disc having a central mounting surface and a plurality of outwardly extending spokes, each of said spokes having at least two holes formed therein;
    at least one rim to disc interface area provided along each of said spokes wherein some portion of a surface of said rim and some portion of a surface of said spoke contact one another; and
    a fastener extending through each of said at least two holes of each of said spokes and through an associated at least two holes of said plurality of holes of said rim to secure said rim and disc together;
    wherein said central mounting surface of said wheel disc includes a center pilot aperture and a plurality of lug bolt receiving holes circumferentially spaced around said pilot aperture; and wherein said lug bolt receiving holes are in line with a respective one of each of said spokes.

12. The fabricated vehicle wheel according to claim 11 wherein at least one of said spokes flare radially outwardly.

13. The fabricated vehicle wheel according to claim 11 wherein said central mounting surface of said wheel disc includes a plurality of ribs provided therein.

14. The fabricated vehicle wheel according to claim 13 wherein a rib is located between each pair of said lug bolt receiving holes.

15. The fabricated vehicle wheel according to claim 13 wherein each of said ribs is defined by a raised or embossed area which extends outwardly from or above said central mounting surface.

16. The fabricated vehicle wheel according to claim 1 wherein said fastener has a non-round body.

17. A fabricated vehicle wheel comprising:
    a wheel rim having a plurality of holes formed therein;
    a wheel disc having a central mounting surface and a plurality of outwardly extending spokes, each of said spokes having at least two holes formed therein;
    at least one rim to disc interface area provided along each of said spokes wherein some portion of a surface of said rim and some portion of a surface of said spoke contact one another; and
    a fastener extending through each of said at least two holes of each of said spokes and through an associated at least two holes of said plurality of holes of said rim to secure said rim and disc together;
    wherein said disc and said rim are secured together in a bead seat area to produce a bead seat attached vehicle wheel.

18. The fabricated vehicle wheel according to claim 1 wherein said disc and said rim are secured together in a well area to produce a well attached vehicle wheel.

19. The fabricated vehicle wheel according to claim 1 wherein said central mounting surface of said wheel disc includes a plurality of ribs provided therein.

20. The fabricated vehicle wheel according to claim 19 wherein a rib is located between each pair of said lug bolt receiving holes.

21. The fabricated vehicle wheel according to claim 19 wherein each of said ribs is defined by a raised or embossed area which extends outwardly from or above said central mounting surface.

22. The fabricated vehicle wheel according to claim 11 wherein at least one of said spokes includes at least one window formed therein.

23. The fabricated vehicle wheel according to claim 11 wherein at least one of said spokes includes a rear wall, a pair of opposed side walls extending from said rear wall, and an outermost end wall which defines a mounting flange, said pair of opposed side walls including a first pair of inner side walls and a second pair of outer side walls, said inner side walls extending generally parallel to one another and said outer side walls extending radially outwardly relative to said inner side walls at preselected angles.

24. The fabricated vehicle wheel according to claim 23 wherein said inner side walls extend a first radial distance and said outer side walls extend a second radial distance, the first and second radial distances being generally the same.

25. The fabricated vehicle wheel according to claim 23 wherein said inner side walls extend a first radial distance and said outer side walls extend a second radial distance, the first and second radial distances being different.

26. The fabricated vehicle wheel according to claim 23 wherein said inner side walls define a first spoke width and outermost ends of said outer side walls define a second spoke width is greater than said first spoke width.

27. The fabricated vehicle wheel according to claim 26 wherein said second spoke width is at least 5 percent greater than said first spoke width.

28. The fabricated vehicle wheel according to claim 26 wherein said second spoke width is at least 50 percent greater than said first spoke width.

29. The fabricated vehicle wheel according to claim 11 wherein said fastener is a rivet.

30. The fabricated vehicle wheel according to claim 11 wherein said holes formed in said spokes and said rim are formed by one of a piercing, drilling or laser cutting method.

31. The fabricated vehicle wheel according to claim 11 wherein two spaced apart rim to disc interface areas are provided.

32. The fabricated vehicle wheel according to claim 11 wherein said fastener has a non-round body.

33. The fabricated vehicle wheel according to claim 11 wherein said disc and said rim are secured together in a bead seat area to produce a bead seat attached vehicle wheel.

34. The fabricated vehicle wheel according to claim 11 wherein said disc and said rim are secured together in a well area to produce a well attached vehicle wheel.

35. The fabricated vehicle wheel according to claim 17 wherein at least one of said spokes includes at least one window formed therein.

36. The fabricated vehicle wheel according to claim 17 wherein at least one of said spokes includes a rear wall, a pair of opposed side walls extending from said rear wall, and an outermost end wall which defines a mounting flange, said pair of opposed side walls including a first pair of inner side walls and a second pair of outer side walls, said inner side walls extending generally parallel to one another and said outer side walls extending radially outwardly relative to said inner side walls at preselected angles.

37. The fabricated vehicle wheel according to claim 36 wherein said inner side walls extend a first radial distance and said outer side walls extend a second radial distance, the first and second radial distances being generally the same.

38. The fabricated vehicle wheel according to claim 36 wherein said inner side walls extend a first radial distance and said outer side walls extend a second radial distance, the first and second radial distances being different.

39. The fabricated vehicle wheel according to claim 36 wherein said inner side walls define a first spoke width and outermost ends of said outer side walls define a second spoke width is greater than said first spoke width.

40. The fabricated vehicle wheel according to claim 39 wherein said second spoke width is at least 5 percent greater than said first spoke width.

41. The fabricated vehicle wheel according to claim 39 wherein said second spoke width is at least 50 percent greater than said first spoke width.

42. The fabricated vehicle wheel according to claim 17 wherein said fastener is a rivet.

43. The fabricated vehicle wheel according to claim 17 wherein said holes formed in said spokes and said rim are formed by one of a piercing, drilling or laser cutting method.

44. The fabricated vehicle wheel according to claim 17 wherein two spaced apart rim to disc interface areas are provided.

45. The fabricated vehicle wheel according to claim 17 wherein said central mounting surface of said wheel disc includes a center pilot aperture and a plurality of lug bolt receiving holes circumferentially spaced around said pilot aperture.

46. The fabricated vehicle wheel according to claim 45 wherein said lug bolt receiving holes are in line with a respective one of each of said spokes.

47. The fabricated vehicle wheel according to claim 17 wherein said central mounting surface of said wheel disc includes a plurality of ribs provided therein.

48. The fabricated vehicle wheel according to claim 47 wherein a rib is located between each pair of said lug bolt receiving holes.

49. The fabricated vehicle wheel according to claim 47 wherein each of said ribs is defined by a raised or embossed area which extends outwardly from or above said central mounting surface.

50. The fabricated vehicle wheel according to claim 17 wherein said fastener has a non-round body.

51. The fabricated vehicle wheel according to claim 17 wherein at least one of said spokes flare radially outwardly.

* * * * *